July 6, 1965

H. M. DOWD ETAL 3,193,290

AUTOMATIC BOWLING PINSETTING MACHINES

Filed June 20, 1962

INVENTORS
HOWARD M. DOWD
ROYAL L. BARROWS

BY

*Cedric W. Porter*

ATTORNEY

July 6, 1965

H. M. DOWD ETAL 3,193,290

AUTOMATIC BOWLING PINSETTING MACHINES

Filed June 20, 1962

INVENTORS
HOWARD M. DOWD
ROYAL L. BARROWS

BY

*Cedric W. Porter*

ATTORNEY

July 6, 1965

H. M. DOWD ETAL 3,193,290

AUTOMATIC BOWLING PINSETTING MACHINES

Filed June 20, 1962

INVENTORS
HOWARD M. DOWD
ROYAL L. BARROWS

BY

ATTORNEY

July 6, 1965 H. M. DOWD ETAL 3,193,290
AUTOMATIC BOWLING PINSETTING MACHINES
Filed June 20, 1962 21 Sheets-Sheet 5

INVENTORS
HOWARD M. DOWD
ROYAL L. BARROWS
BY
*Cedric W. Porter*
ATTORNEY

INVENTORS
HOWARD M. DOWD
ROYAL L. BARROWS

BY Cedric W. Porter

ATTORNEY

July 6, 1965 H. M. DOWD ETAL 3,193,290
AUTOMATIC BOWLING PINSETTING MACHINES
Filed June 20, 1962 21 Sheets-Sheet 8

INVENTORS
HOWARD M. DOWD
ROYAL L. BARROWS
BY
Cedric W. Porter
ATTORNEY

INVENTORS
HOWARD M. DOWD
ROYAL L. BARROWS

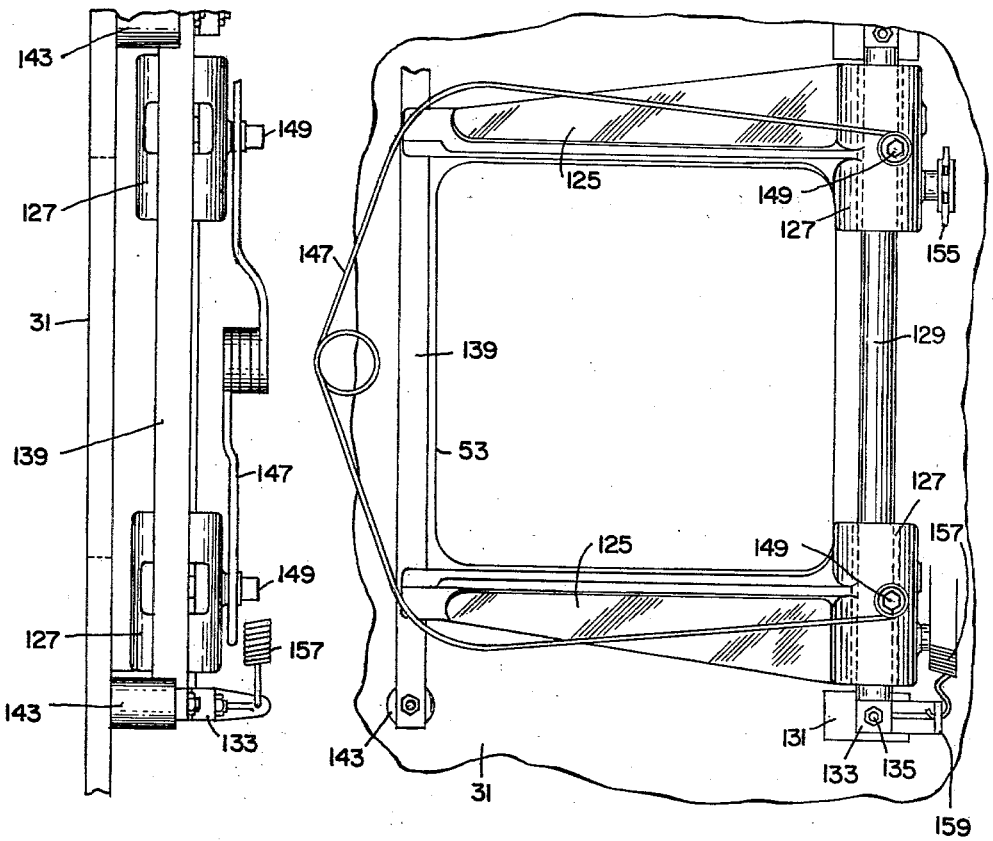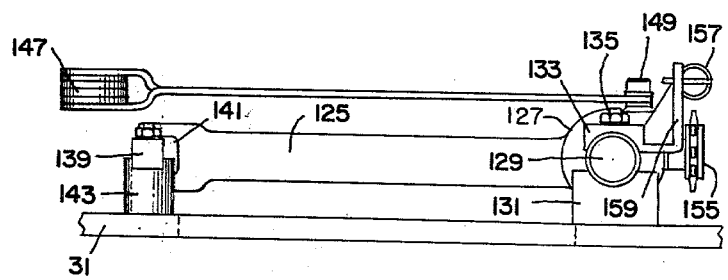

July 6, 1965

H. M. DOWD ETAL 3,193,290

AUTOMATIC BOWLING PINSETTING MACHINES

Filed June 20, 1962

INVENTORS
HOWARD M. DOWD
ROYAL L. BARROWS
BY

*Cedric W. Porter*

ATTORNEY

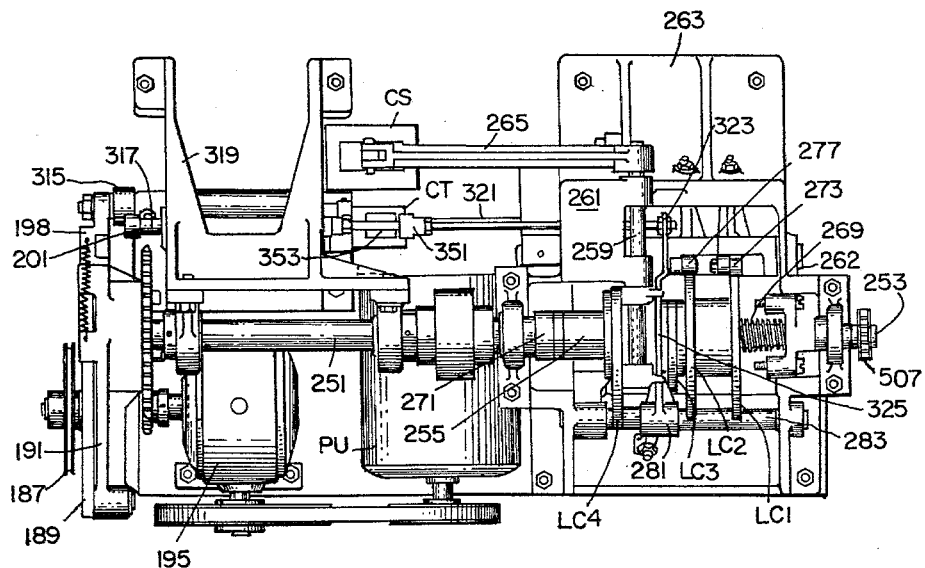
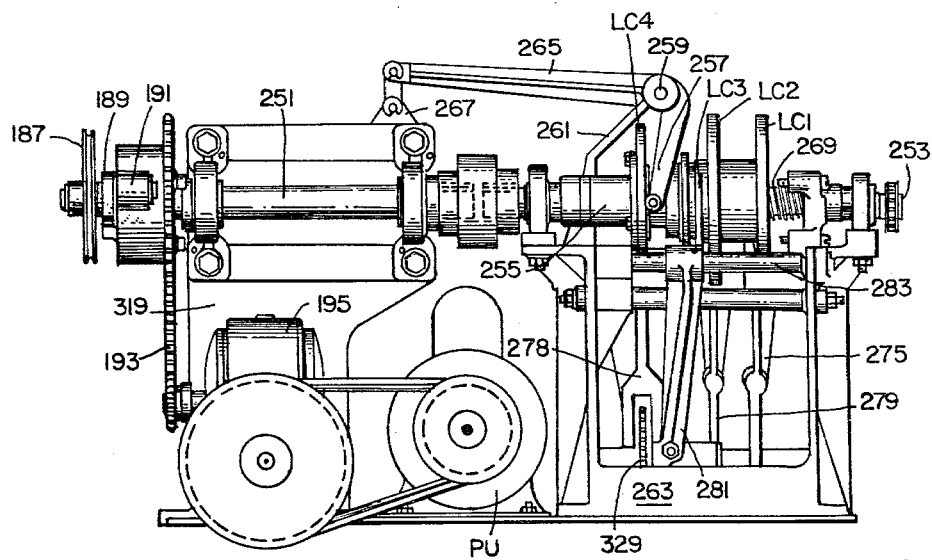

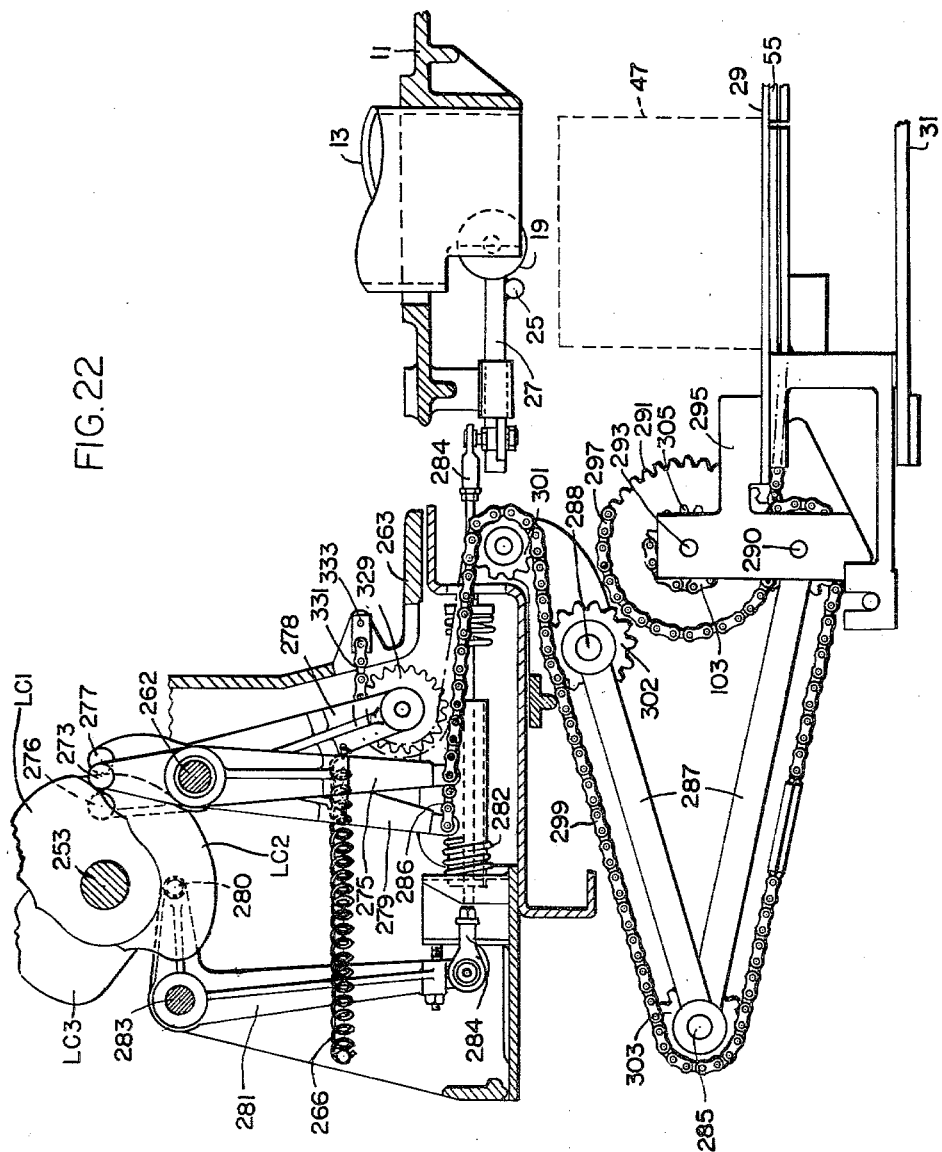

July 6, 1965
H. M. DOWD ETAL
3,193,290
AUTOMATIC BOWLING PINSETTING MACHINES
Filed June 20, 1962
21 Sheets-Sheet 16
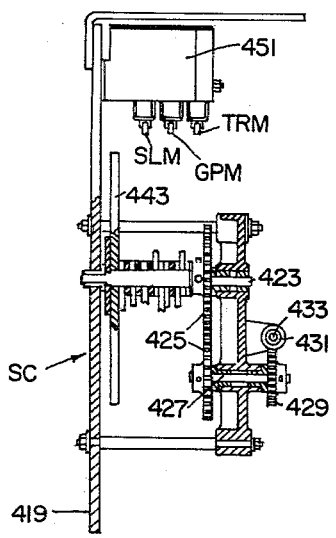
FIG. 27
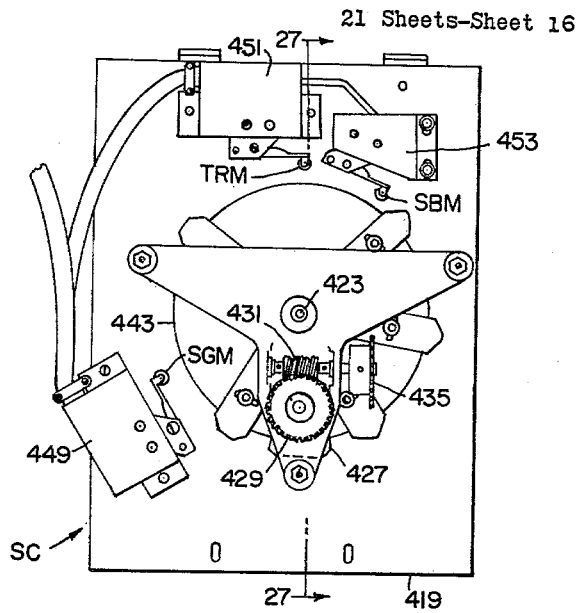
FIG. 25
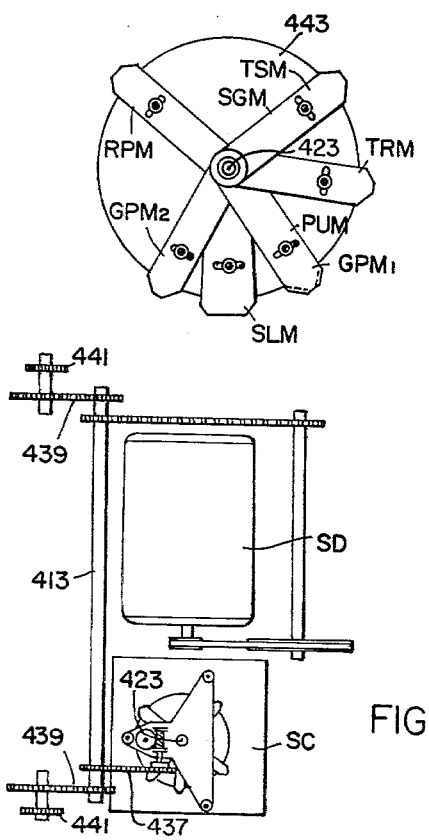
FIG. 28
FIG. 24
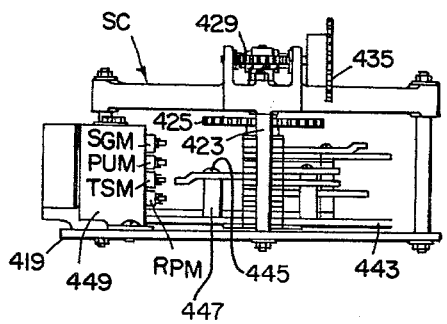
FIG. 26
INVENTORS
HOWARD M. DOWD
ROYAL L. BARROWS
BY
Cedric W. Porter
ATTORNEY

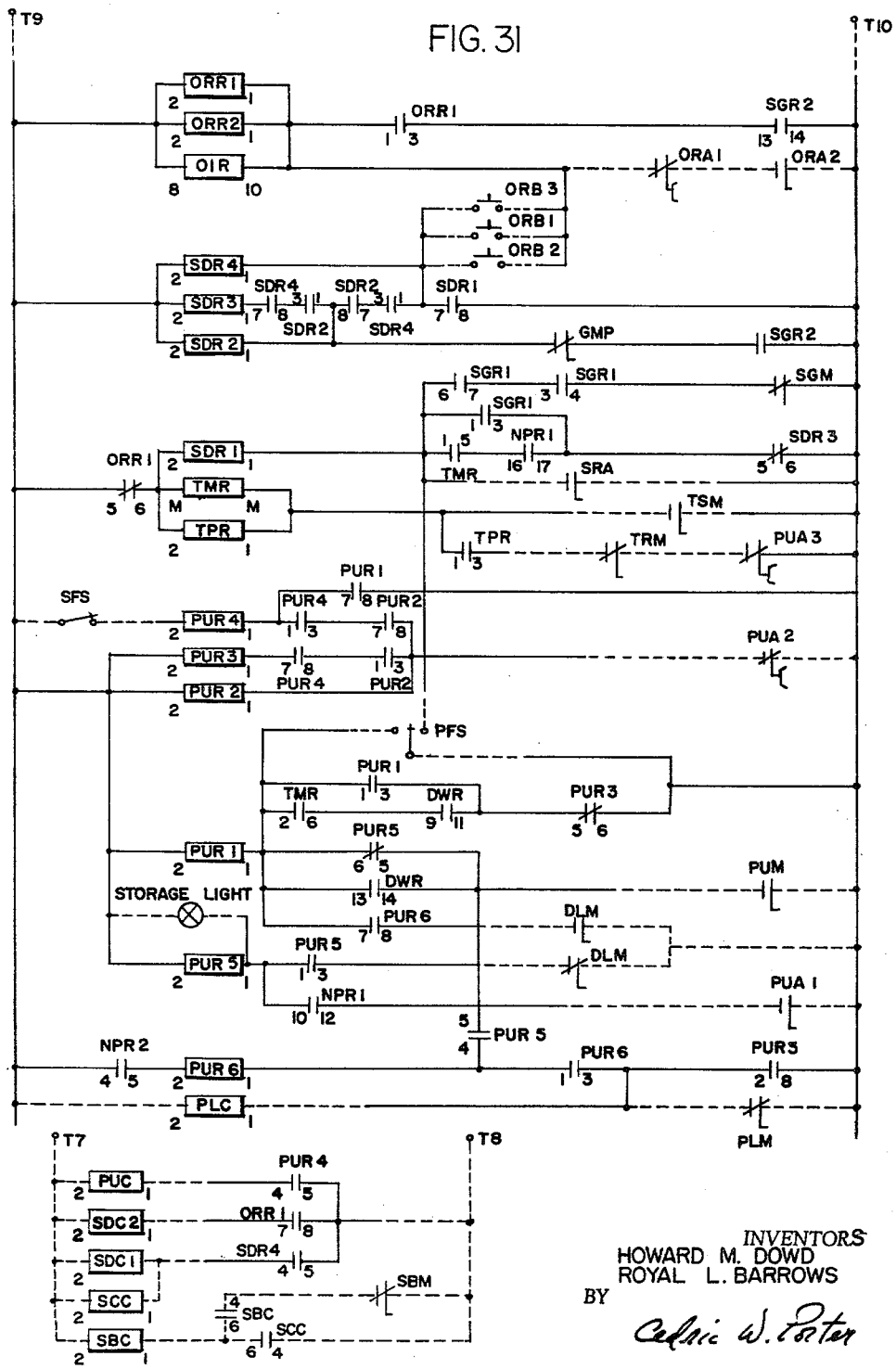

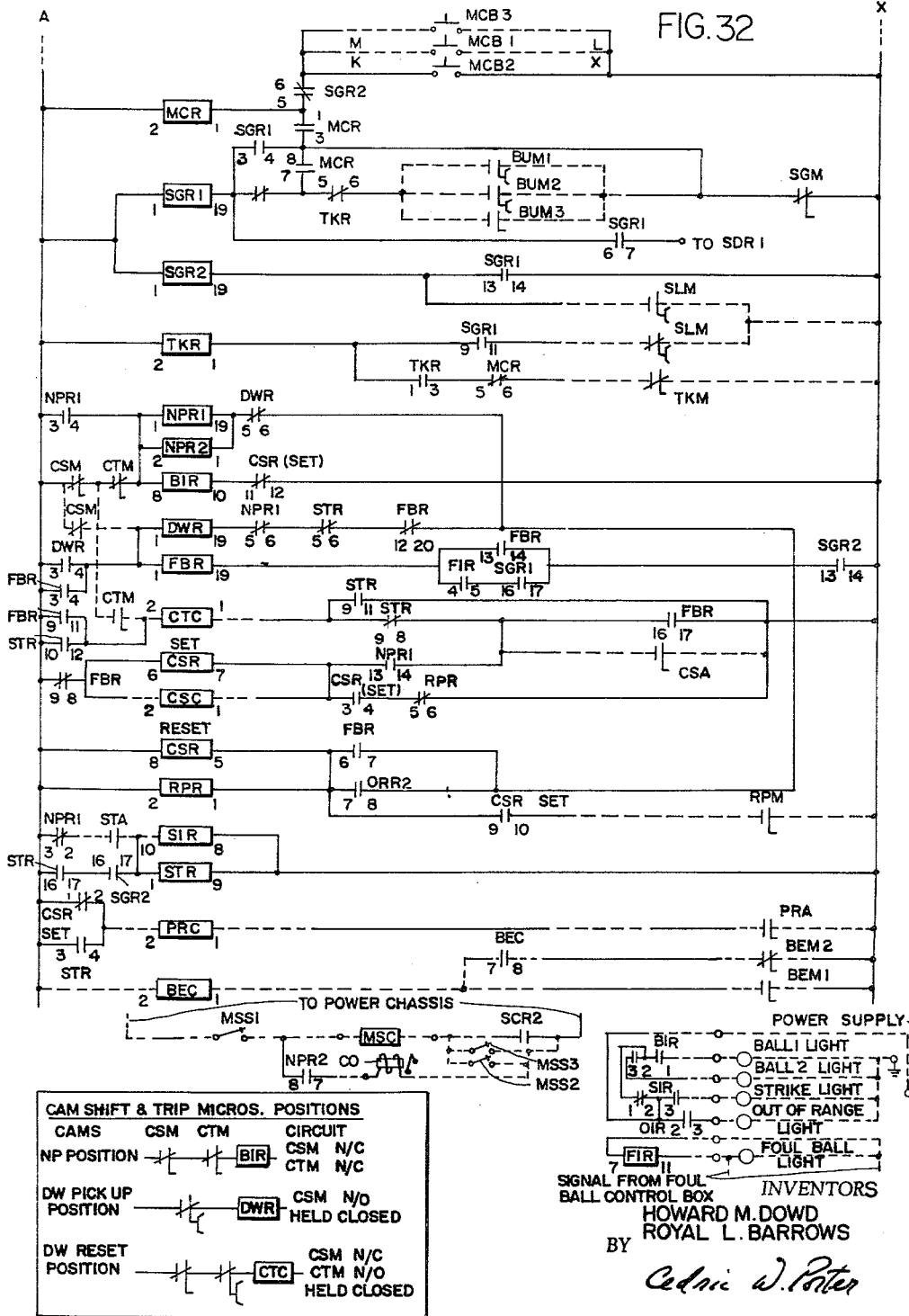

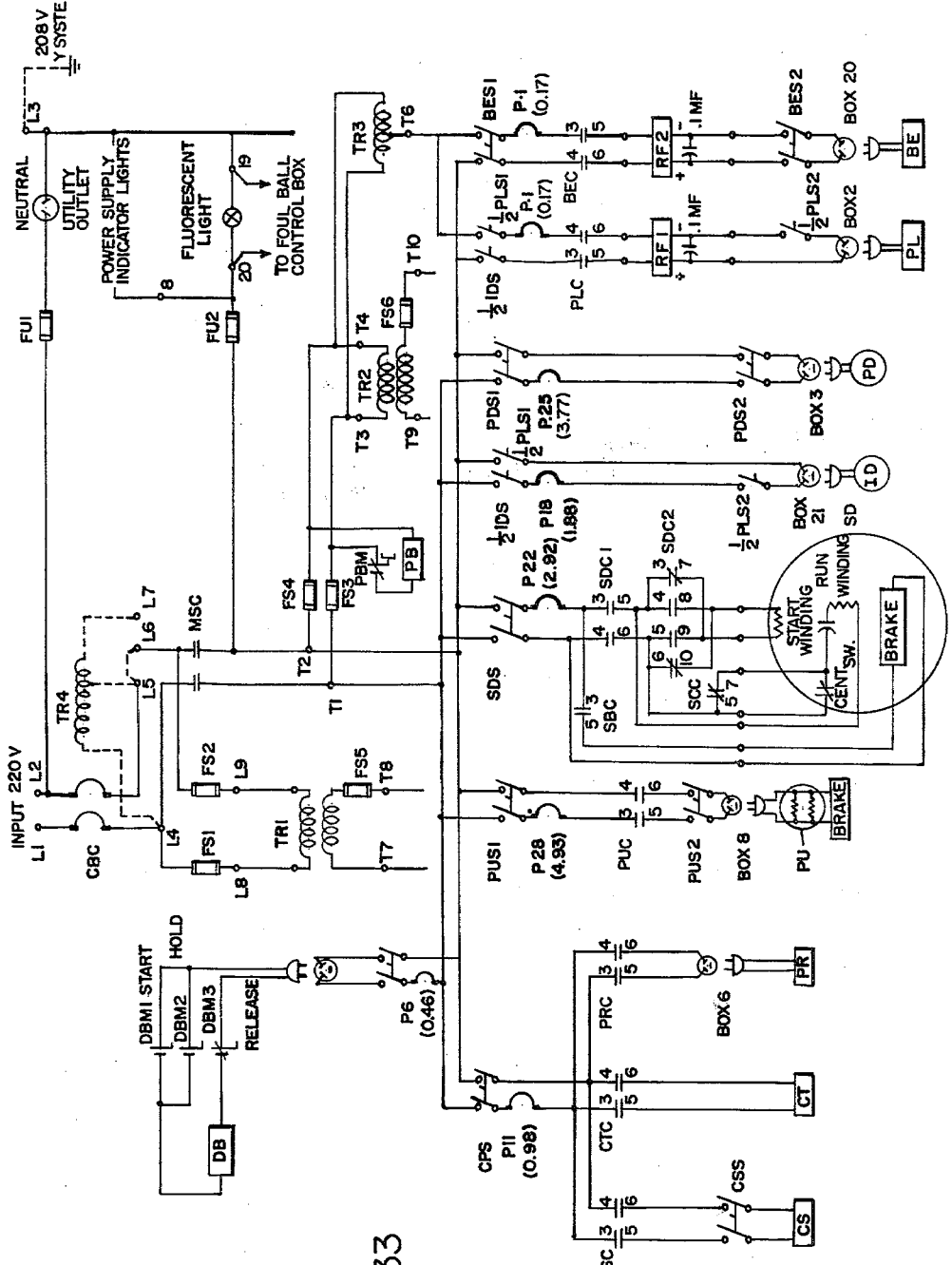

July 6, 1965   H. M. DOWD ETAL   3,193,290
AUTOMATIC BOWLING PINSETTING MACHINES
Filed June 20, 1962   21 Sheets-Sheet 21

INVENTOR.
HOWARD M. DOWD
ROYAL L. BARROWS
BY
ATTORNEY

United States Patent Office 3,193,290
Patented July 6, 1965

3,193,290
AUTOMATIC BOWLING PINSETTING MACHINES
Howard M. Dowd and Royal L. Barrows, Middleton, Mass., assignors, by mesne assignments, to State Street Bank and Trust Company, Boston, Mass., a corporation of Massachusetts
Filed June 20, 1962, Ser. No. 208,174
24 Claims. (Cl. 273—43)

This invention relates to bowling pin setting machines of the type shown in Barrows Patent No. 3,014,720 of Dec. 26, 1961, and more particularly to novel mechanism for automatically setting the heaviest of the family of bowling pins, namely those having a height of fifteen inches and a diameter of four and three-quarter inches, commonly known as ten pins.

As is well known, the purpose of machines of this class is to perform automatically the functions of the conventional pin-boy in setting up the pins, clearing away the fallen pins or "deadwood," and returning the balls.

This undertaking, so simply stated, is inherently complicated by the random fall and lie of the pins and the varied locations of the spent balls and by the necessity for exact placement of the pins on their spots, when automatic mechanism is called on to susbtitute for human vision, intelligence and dexterity.

Pin setting machines have reached a stage of development that is eminently successful commercially and widely accepted by the bowling public. But they still leave room for improvement, and it is the object of the present invention to simply the construction and operation so as to make them less costly to build and surer and more accurate in performance, freer from malfunctions and jams and breadowns, easier to service and demanding no high degree of mechanical skill in the attendant, requiring less repair and replacement of parts, more compact, and capable of installation in existing alleys without requiring remodeling of the alleys, their underpinning, or the building roof and walls. Other aims include the increase of the range within which the machines can pick up and re-spot pins which are left standing off their spots after the first ball of a box is bowled, to allow clearing of deadwood; also, prevention of manipulation of the machines to effect unfair and illegitimate placement or shift of the pins on the pin deck to favor or impede the bowler. Further purposes are to reduce the wear and tear on the pins resulting from the mechanical handling thereof, thus attaining longer useful life of the pins, and to quiet the operation of the machine. Additional objects are as pointed out hereinafter.

To these ends, the invention comprises essentially means for automtically assembling a set of ten pins and storing them in relatively spaced array each above its corresponding pin spot on the pin deck of the alley or lane, a vertically reciprocating pin setter receiving the pins from the storage means and arresting and supporting them over the pin spots by their bottoms on a sliding shutter, and means on the pin setter grasping the pins by their necks as the shutter is withdrawn from supporting relation with the pins, such means releasing the necks and thus the pins as the pin setter completes its descent and the pin bottoms reach the pin deck. Preferably the pin setter includes novel pick-up means for re-engaging the necks of the pins, after the first ball has been bowled at the pins, by a pair of wide jaws which approach the neck of each pin left standing, the first of such jaws stopping its travel toward the neck upon contact therewith at any point within its range, and the other jaw continuing its advance till it in turn engages the neck, thus grasping the pin without displacing it, whereupon the pin setter ascends to lift the standing pins and permit the deadwood to be swept from the alley. Thereafter the pin setter descends, replaces the lifted pins in the same positions on the pin deck whence it took them, opens the jaws and releases them, and again ascends out the way of the second ball to be bowled.

Because the pins are arrested in their drop from the storage means by landing on their bottoms on the flat surface of the shutter, instead of being stopped by the wedging of their sides, below the bulge, between a fixed guide tube and a retractable stop, as in certain prior structures, they are spared the wear and tear from this source which was a drawback of prior machines. To this same end, the invention further makes all surfaces which engage the pins between their release from the assembling means and their arrival at the storage means out of non-metallic resilient material, such as rubber, felt, nylon, Teflon, and the like. Thereafter, all handling of the pins in initially spotting, retrieving, and re-spotting them on the pin deck is confined to their bottoms and to their concave surfaces, i.e., the necks, so that any chafing of the pin surfaces which may occur in setting them is restricted to areas on the pins which have no harmful effect on the performance of the pins when in play.

To insure against shifting of the standing pins by the pick-up jaws of novel type in retrieving them to permit sweeping of the deadwood, the pin setter is made to descend and press down on the tops or heads of the standing pins until the jaws have closed fully on the necks. Preferably, as herein, this is done by the shutter, which is moved back to its initial pin-supporting position and thus over the standing pins, and resilient pads of rubber, felt or the like fixed on the under surface of the shutter are used to apply the pressure without danger of harming the finish on the pins.

Novel sweep mechanism for clearing the pins from the alley, and improved control means governing its action and its control of the pin-setting are also provided.

The manner and means of attaining the foregoing and other objects of the invention are as set forth hereinafter.

An illustrative embodiment of the invention is shown in the accompanying drawings, in which:

FIGS. 15, 16 and 17 are respectively plan, front, and side views of one pair of retrieving jaws.

FIGS. 20 and 21 are side elevation and plan views, respectively, of the power unit for the pin setter.

FIG. 22 is an elevation, partly in section, showing the actuation of the storage release and the shutter by the power unit.

FIG. 24 shows the driving means for the sweep and the sweep control.

FIGS. 25 and 26 are plan and side elevation, respectively, of the sweep control.

FIG. 27 is a section on line 27—27 of FIG. 25.

FIG. 28 shows the turn-table and cams mounted thereon, of FIGS. 25–27.

FIGS. 31 to 33 are schematic circuit diagrams showing the preferred system for controlling the operation of the several coacting mechanisms, with power off and all parts in home position.

Figure 1:
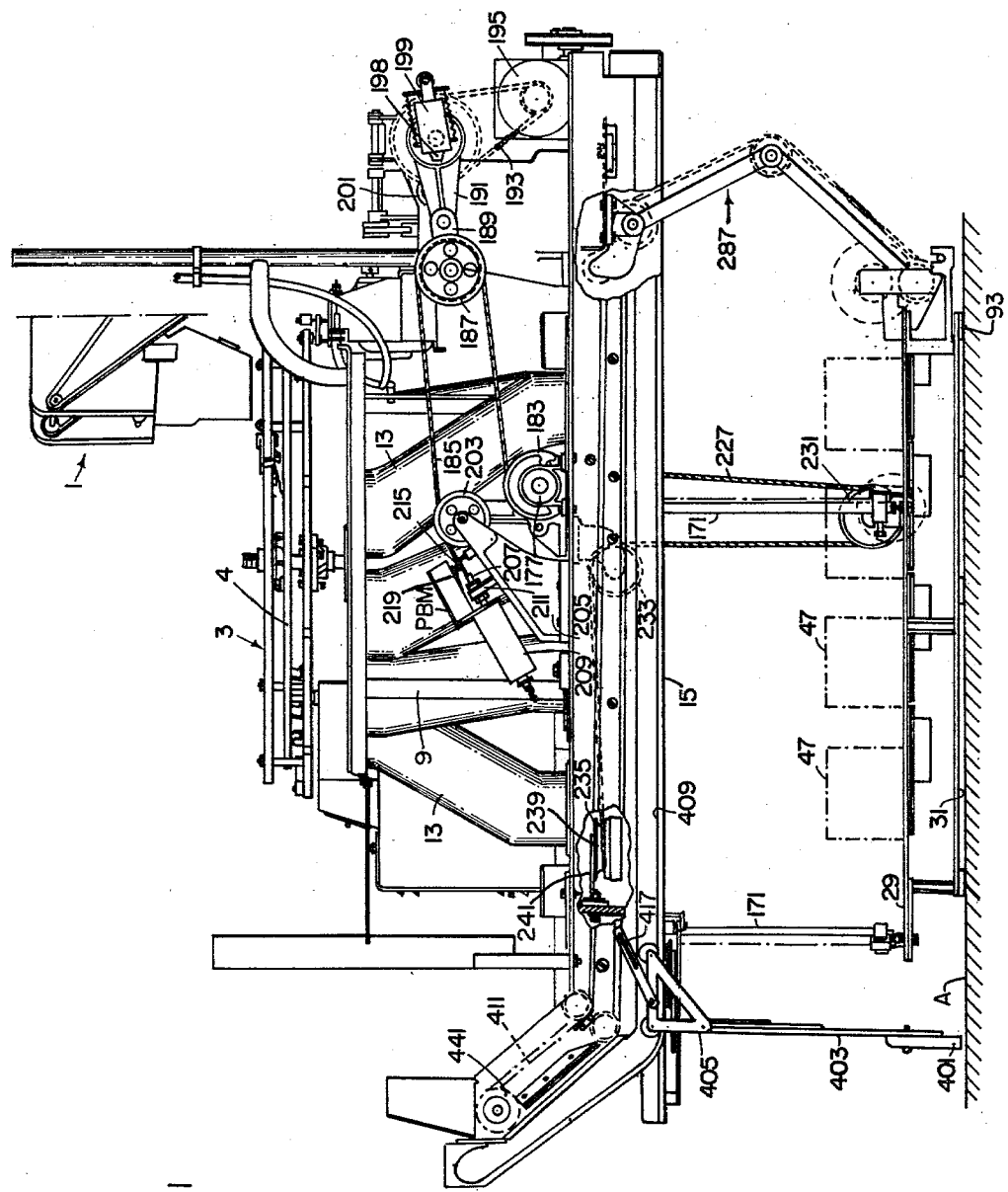
FIG. 1 is a side elevation, partly in section, of a bowling pin setting machine embodying the features of the invention, with the pin-gathering and ball-return mechanism omitted.

The machines embodying the present invention are usually installed in pairs with a common ball return. Each machine consists of four principal systems mechanically and electrically coordinated to perform their functions without attention during normal bowling. These systems are:

(1) SWEEP SYSTEM—to sweep pins from the pin deck.

(2) PIT SYSTEM—to return the ball to the bowler and deliver the pins to the collector or "index."

(3) INDEX SYSTEM—to receive the pins and collect them into a set of 10 pins for delivery to the pin setter.

(4) PIN SETTERS—to set the pins on the alley.

OPERATING CYCLES

During routine bowling, the machine operates automatically throughout the two cycles required by the bowling of the first and second balls of each frame or "box." After the second ball of a frame has been rolled, as well as after a strike made by the first ball rolled, 10 new pins are set automatically. Also, when used with a foul detector, the machine automatically sets 10 new pins on the first ball foul detected by the foul detector.

On a 10th frame spare, the bowler can cycle the machine for 10 new pins by use of the Bowler's Machine Cycle button. Only on the infrequent occurrence of an out-of-range pin, one that has been moved over 2¼ inches and is still standing, is it necessary for an attendant to intervene and assist the machine, in this case to remove the deadwood by hand and reset the machine for the second ball or "Ball 2" cycle.

Indicator lights

Five indicator lights are provided on the screen or "masking unit" facing the bowler to inform him on the state of the machine. They are the Ball 1 light, the Ball 2 light, the Strike (X) light, the out-of-range light, and the foul light.

As the machine completes the setting of 10 new pins, the figure "1" is illuminated. It remains lit until the machine is ready for Ball 2, unless a strike, foul, or out-of-range condition occurs.

As the machine completes the resetting of standing pins following the rolling of Ball 1, the figure "2" is illuminated. It remains lit until the machine is ready for Ball 1 of the next frame.

When the machine attempts to pick up standing pins following a strike and finds none, the Ball 1 light goes out and a large "X" is illuminated on the masking unit. It remains lit until the machine has set 10 new pins, at which time the Ball 1 light is again illuminated.

If the machine is unable to pick up standing pins because one or more of them are far enough off spot to be out of range of the machine, the yellow "out-of-range" light is illuminated. The Ball 1 light remains on until the deadwood is cleared and the sweep comes to rest in the home position after being driven in reverse through the manual use of the sweep reverse button. At this time the Ball 1 light is replaced by the Ball 2 light. The "out-of-range" light goes out and the machine is ready for the rolling of Ball 2.

A red light is also provided on the masking unit, which may be connected to an automatic foul detector, if one is used. In the following paragraphs the actual operation of the machine during the various cycles is described.

Ball 1 cycle

The Ball 1 cycle covers the operation of the machine from the rolling of the first ball until the machine comes to rest, ready for the bowler's second ball. Upon delivery of the first ball, the Ball 1 or deadwood cycle is started by the ball hitting the bumper cushion in the pit and actuating one of the bumper micro-switches or the switch in the ball elevator. This switch through relays and contacts causes the sweep member to drive the sweep to guard position No. 1 (GP–1), a vertical position in front of the pins. The ball is immediately returned to the bowler by the ball elevator and ball return track.

*Pick-up of standing pins.*—Following the rolling of the first ball, the pins are picked up or set by a triangular unit called the pin setter that is driven by the power unit. The pin setter picks up standing pins and resets them, or sets 10 new pins drawn from storage. It is lowered and raised vertically on three sets of racks and pinion gears by the power unit according to the setting of the power unit control cams for either the deadwood cycle or the new pin cycle.

On the Ball 1 or deadwood cycle, after the sweep reaches GP–1 the pin setter is lowered from its home position onto the heads of the standing pins with a time delay of approximately 3 seconds after impact of the ball against the bumper, to allow tottering pins to fall. The standing pins are "frozen" in their position by the weight of the pin setter which descends upon their heads, and are then picked up by the pin setter.

*Deadwood sweep.*—The sweep then moves over the pin deck to the pit and returns to a guard position in front of the pins. This position of the sweep is physically the same as GP–1, but is called guard position No. 2 (GP–2), as the continuous chain drive propelling the sweep is in another part of its cycle. This motion of the sweep brings all fallen pins to the pit, where the turn-table and pin lift or elevator transport them to the index assembly, where they are collected into a new set of 10 pins for setting on a subsequent cycle.

*Resetting pins.*—The standing pins picked up by the pin setter are now lowered thereby and reset in exactly the same position in which they were frozen on the previous descent of the pin setter. After resetting the pins, the pin setter rises and the cams on the power unit are positioned for the Ball 2 cycle. The sweep then moves to its home position, out of the way, and the Ball 2 indicator light on the masking unit signals the bowler that he may proceed.

*Ball 2 cycle*

Upon delivery of the second ball, the Ball 2 or New Pin Cycle is started by the ball hitting the bumper cushion and actuating one of the bumper micro-switches or the ball elevator micro-switch as in the Ball 1 cycle. The sweep is moved to GP–1 and after a momentary delay proceeds to sweep all pins to the pit and then returns to GP–2. The ball is immediately returned to the bowler. On this cycle the cams of the power unit are set for new pins and the pin setter descends with 10 pins from storage and sets them on the pin deck, properly spotted. The pin setter then rises, the sweep returns to its home position, and the Ball 1 indicator light signals that a bowler may proceed with the next frame.

*Strike cycle*

When a bowler makes a strike, the machine as already noted automatically sets 10 pins for the next frame, and also indicates a strike by lighting a large "X" on the masking unit. The cycle begins as a Ball 1 cycle and continues as such until the pin setter descends to freeze the standing pins. As there are no standing pins, the pin setter goes as low as its hoisting cable will allow it, actuates switches that eliminate the rest of the Ball 1 cycle for the machine, and the pin setter rises empty to its own position. The sweep then clears the pin deck by moving from GP–1 to GP–2, and the pin setter descends with 10 new pins. When the pin setter returns home after setting the pins the sweep returns to its home position and Ball 1 is indicated on the masking unit.

SPECIAL OPERATIONS

The previously described cycles of operation cover almost all of the conditions encountered in either league or open bowling, and all without the necessity of pressing a button. Occasionally situations arise that must be handled manually.

*Tenth-frame spare*

Whenever a bowler rolls a spare in the tenth frame, he is entitled to roll another or "spare" ball. After rolling this ball, some pins may be standing, but the next bowler requires 10 new pins. Pressing the Machine Cycle Button will put the machine through the Ball 2 cycle to set 10 new pins.

*Shadow bowling*

The machine may be set so that practice balls can be rolled and returned by the machine with no pins on the pin deck.

*Foul*

A bowler committing a foul by overstepping the "line" loses all pins knocked down by that ball. When this occurs on the first ball of a frame, it requires that 10 new pins be set before the next ball is rolled. If an automatic foul detector is used, the circuit that lights the foul light is used to actuate relays to send the machine through a cycle to set 10 new pins. In cases where the foul detector does not detect the foul, 10 new pins may be obtained by pressing the bowler's Machine Cycle Button.

*Out-of-range pins*

On those few occasions when a ball moves a pin out of range (2¼ inches or more off spot) of the pick-up bars on the pin setter without upsetting it, the cycle stops automatically. The out-of-range pin prevents the pin setter from descending the normal distance, and cam-operated contacts actuate relays that light the yellow out-of-range lamp and set the machine for the out-of-range cycle. The pin setter will return home without picking up any pins and the sweep remains in GP–1.

Any fallen pins on the pin deck must be removed by hand and one of the sweep reverse buttons on the machine must be pressed to restart the machine. The sweep reverse button reverses the sweep drive, moving it from GP–1 back to home position. Relays also set the cams on the power unit for Ball 2 position, so that the machine will cycle normally on the next ball.

The routine operation of the 10 pin machine is entirely automatic through the action of a number of micro switches, cams, relays, and contactors arranged to effect the several functions of the machine at the correct time and under the proper conditions. Several push buttons are also included in the circuits for those operations that are not completely automatic. The location, construction, and operation of these controlling means are set forth in detail hereinafter.

INDEX SYSTEM

The novel features of the invention are shown combined with certain components of the pin setting machines of our companion application Serial No. 625,739, filed Dec. 3, 1956, and now Patent No. 3,063,716. Such prior application discloses the means, omitted herefrom, comprising the PIT SYSTEM, for gathering fallen pins and delivering them to the index or collector, and for returning the bowling balls.

This discharge end of a pin conveyor such as employed in our above application is shown at 1.

The novel collector or "index" 3 which assembles a set of 10 pins rotates as a unit step by step to receive the successive pins dropped into it by the pi nconveyor. It comprises two circular plates fastened together in spaced and parallel relation and a third plate 4 between them which is relatively rotatable thereto, all three plates having a circular series of 10 equally spaced holes, slightly larger than the diameter of the pins, those of the top and bottom plates being always in register with each other, and those of the intervening plate 4 being yieldingly held normally just far enough out of line with the respective holes above and below them to prevent the pins fed thereinto one by one by the pin conveyor 1 from falling through. When the tenth pin of a set being assembled thus in the index drops into its hole, the middle plate 4 is shifted angularly to align its holes with those above and below, and the 10 pins are released to drop into the storage unit described next. The relative movement of middle plate 4 is attained as in our co-pending application named above.

PIN STORAGE

Figure 2:
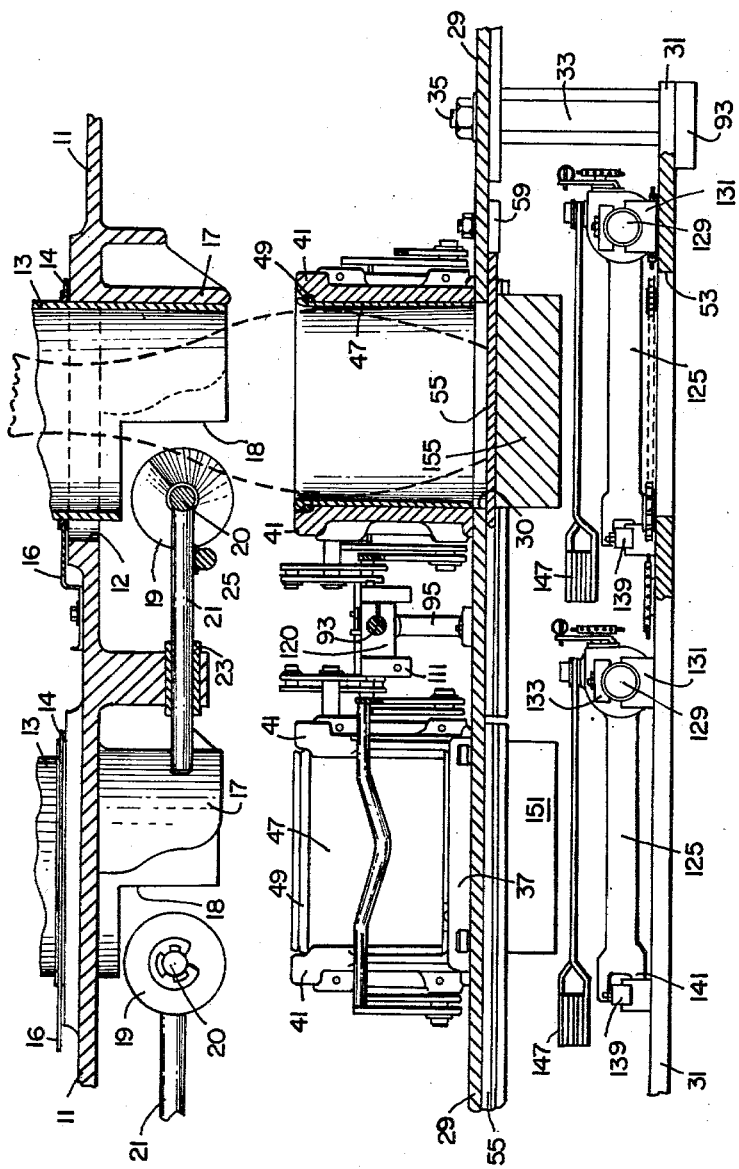
FIG. 2 is an enlarged side elevation, partly in section, of a representative portion of the pin setting means and the pin-retrieving devices.
Figure 3:
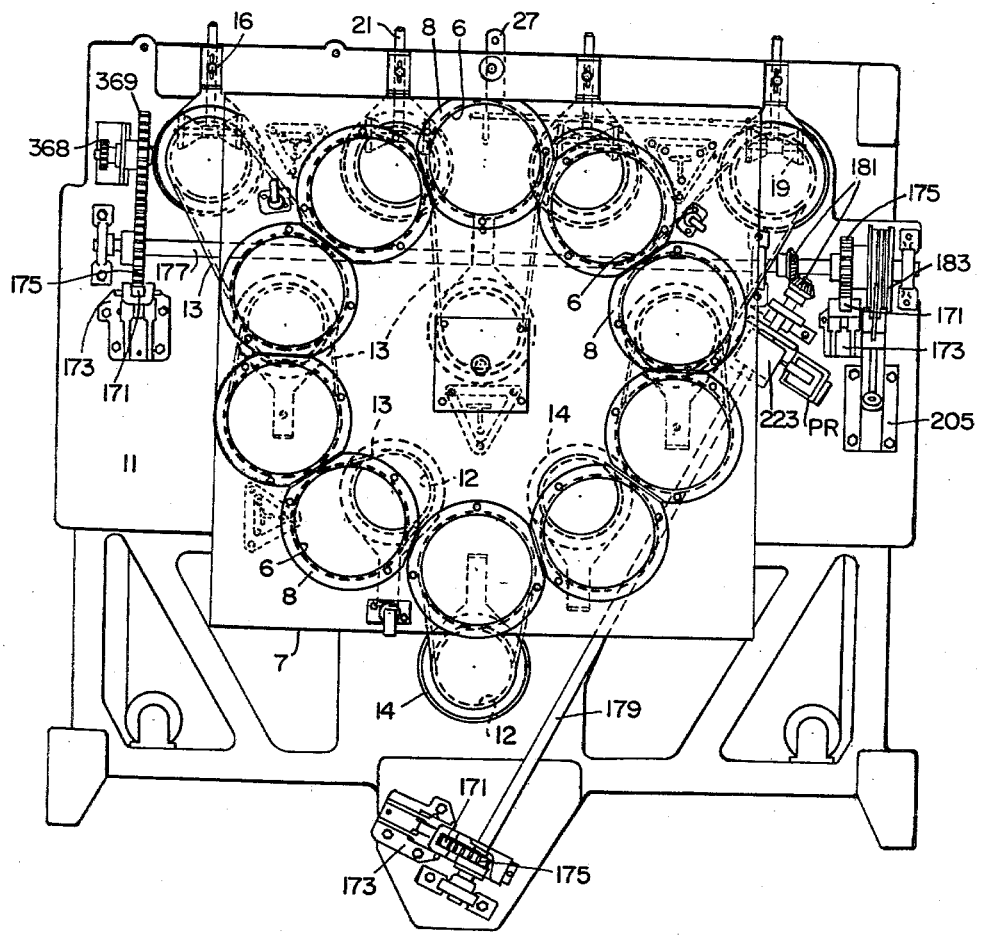
FIG. 3 is a plan view of the delivery chutes and portions of the storage deck, together with the means for effecting and controlling the raising and lowering of the pin setter.

In accordance with the present invention, a rectangular plate 7, FIGS. 1 and 3, mounted on legs 9 in fixed spaced and parallel relation to a fixed storage deck or platform 11 is provided with a circular series of holes 6, FIG. 3, exceeding in diameter and registering with the bottom ends of the 10 holes when the collector is filled with pins and at rest. Each of these holes in plate 7 has affixed therein by its flange 8 the upper end of a chute 13 made of nylon or other plastic tubing, or fabric, whose lower end is affixed in a circular port 12 in the storage deck 11, FIGS. 2 and 5, by a collar 14 surrounding the foot of each chute and affixed to the storage deck. The collar is affixed to the deck 11 by a screw through a slot in its tang 16 so as to hold the chute 13 against one side of the oversized port 12, and is lined with a rubber gasket engaging the chute.

Figure 4:
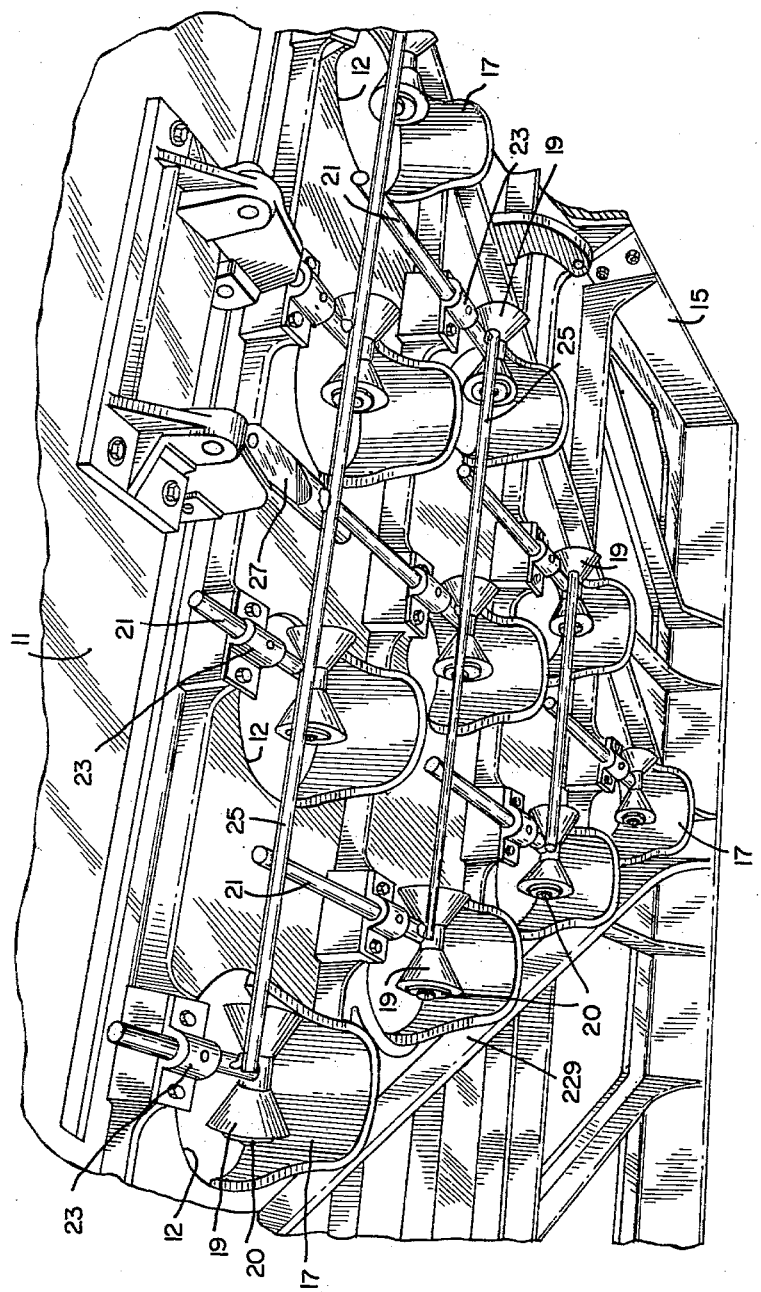
FIG. 4 is a perspective view, from below and the rear, of the storage deck, with its stops and the means for actuating the latter, the chutes being omitted.

The storage deck 11, FIGS. 3 and 4, comprises a generally rectangular partly skeletonized casting having ten ports 12 arranged in the triangular pattern in which the pins are to be set for play, and accordingly is mounted in the alley with each port vertically above a corresponding pin spot on the pin deck A of the alley. It is supported in fixed position on channel girders 15, FIGS. 1 and 4, suitably mounted in horizontal relation and extending longitudinally at each side of the alley at approximately 30 inches above the pin deck. The storage deck, girders, and suitable cross-girts between the girders constitute the stationary chassis of the machine.

From the front side, i.e., the side toward the bowler, of each port 12 depends an integral shield or back-stop 17, FIGS. 2 and 4, lining the port for substantially half its circuit and extending several inches below the under side of the storage deck. The chute 13 extends through the port 12 to the bottom edge of shield 17, and is held in contact with the shield's concave face by the collar 14. The rearward half of the chute is cut away at 18.

A stop 19 is provided for each port 12, to arrest the pins discharged from the collector 3 and distributed by the chutes 13 to the respective ports 12. Herein, this stop comprises a pair of conical members rotatably mounted with their apex ends toward each other upon a spindle 20 fixed at right angles on the end of a shank 21 slidable in a sleeve bearing 23 fastened to a pad formed therefor on the under side of storage deck 11. The conical members of these stops are preferably formed of rubber or other resilient material.

All the stops are connected together to move in unison by being welded to rods 25 extending transversely beneath the storage deck 11, the rearmost rod having an extension 27 pivotally connected to actuating means driven by the power unit cams to be described later herein.

Normally the stops 19 stand sufficiently close to the skirts of the plastic chutes 13 backed up by their respective shields 17 to intercept and arrest the pins P as each slides down its chute 13, the stops engaging the sides of the pins P just below their points of maximum girth and wedging them against the skirts where supported by the shields 17, thus holding them in storage for release to the pin setter upon demand. Retraction of the stops releases the pins to pass down through the ports.

PIN SETTER

The vertically reciprocable pin setter comprises the generally triangular plates, platforms or decks 29 and 31, FIGS. 2, 5, 6, and 14, each provided with apertures or ports disposed in triangular array agreeing with the pin spots and the pattern of the pins when set thereon, and of diameter adequate for the passage of the pins therethrough. The apertures 30 in the upper deck 29 are circular, while those, 53, of the lower deck 31 are rectangular. These two decks are substantially identical in plan, (the upper deck 29 being slightly longer), made of heavy aluminum plate, and are combined in fixed spaced and parallel relation by spacers 33 attached by bolts and nuts 35, FIGS. 2, 5 and 6, at the front and rear corners and at intermediate points, with an aperture of each deck coaxial with an aperture of the other.

Figure 6:
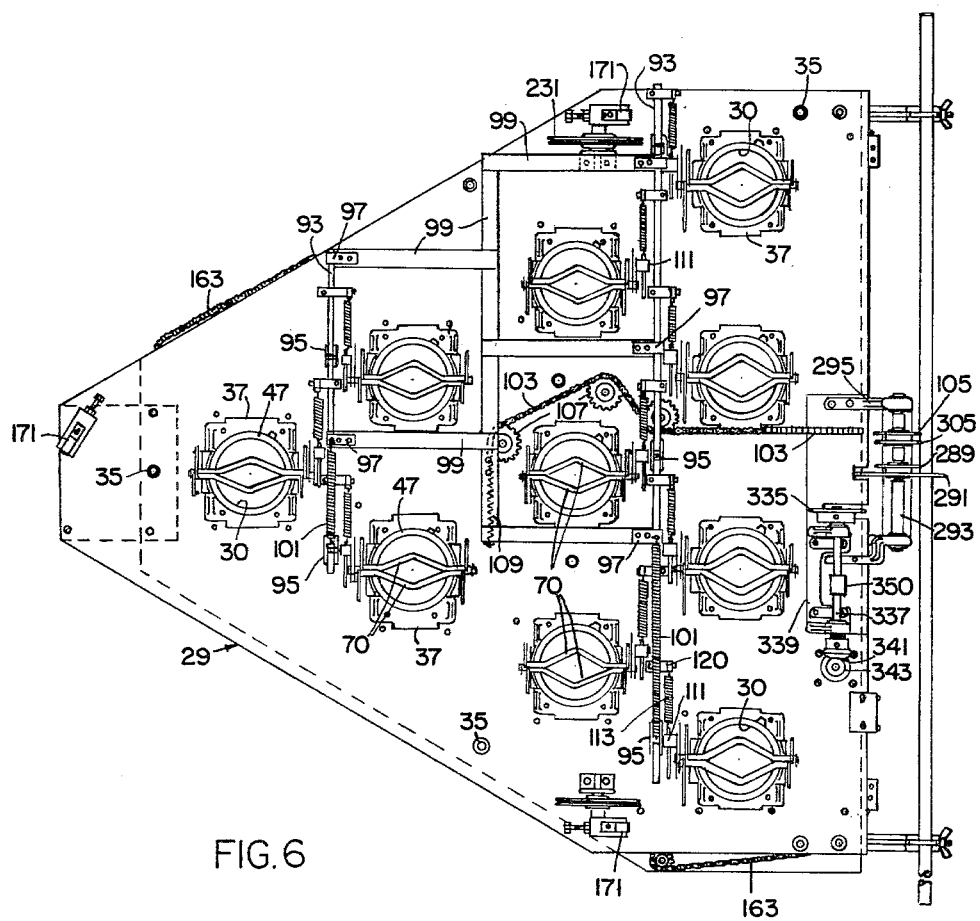
FIG. 6 is a plan view of the upper deck of the pin setter showing the stabilizing yokes which carry the pins down to the pin spots on the alley, and their actuating means.
Figure 9:
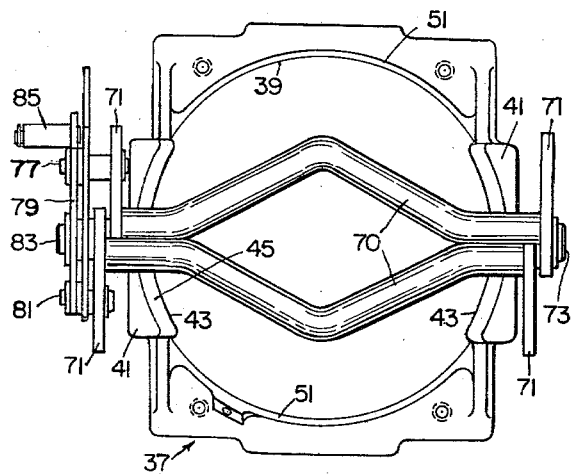
FIGS. 7, 8 and 9 are front and side elevations and plan view respectively of the stabilizing yokes.

A frame 37, FIGS. 2, 6-11, is mounted by bolts through the four corners of its flange upon the top surface of upper deck 29 with its circular aperture 39 in register with each of the apertures 30, FIGS. 2 and 6, in such deck. Two vertical lugs 41 are formed on each frame in diametrically opposite relation, having part-cylindrical concave inward faces 43 and rabbets 45.

Figure 10:
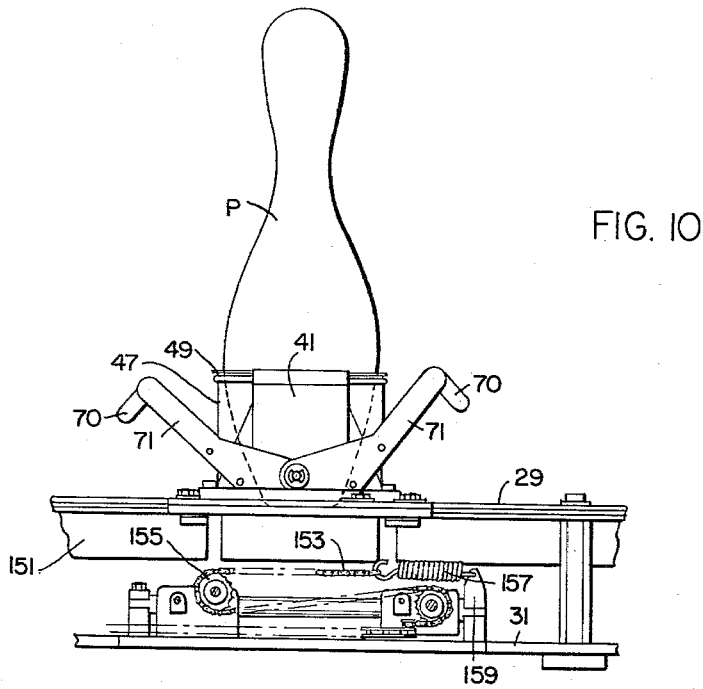
FIG. 10 is a front elevation showing a pin supported on the shutter mounted upon the upper deck of the pin setter, with the stabilizer yokes open.
Figure 11:
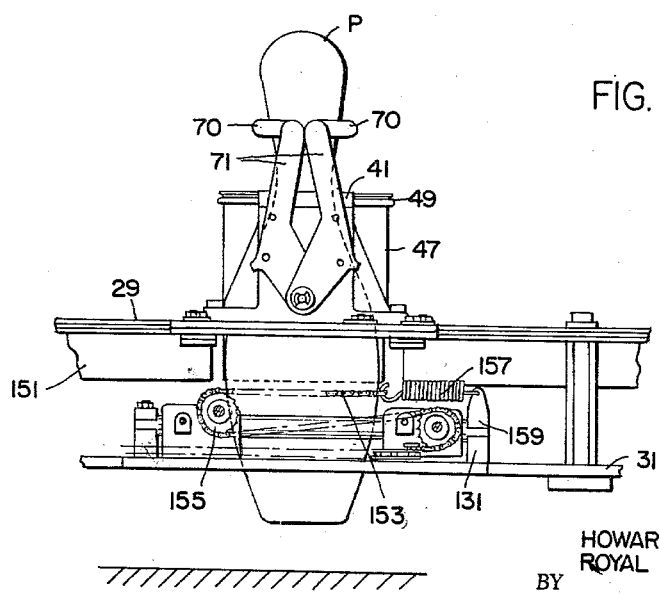
FIG. 11 is a view of the parts of FIG. 10, with the shutter withdrawn and the pin supported in pendent relation in the stabilizer yokes.

A cylindrical sleeve 47, FIGS. 2, 10, 11, preferably of nylon or other suitable non-metallic material, having an internal diameter greater than the pin's diameter and an outside diameter fitting snugly between the surfaces 43 of the lugs 41, is mounted in each frame between the lugs with its flange 49 resting in the rabbets 45 and its foot within the raised rim 51 on the frame and extending to or through the aperture 30 in the deck 29, being held there by a bayonet type lock and a set screw through the rim.

The pin setter composed of the two triangular decks 29, 31 is disposed so that the vertically aligned apertures 30, 53, FIG. 2, of the upper and lower decks are likewise in register with the bottom ends of chutes 13 in ports 12 of the storage deck, and are centered vertically above the pin spots on the pin deck A. Thus the sleeves 47 form open-bottomed cups into which the pins P drop when released from the storage deck 11 by withdrawal of the stops 19.

Figure 5:
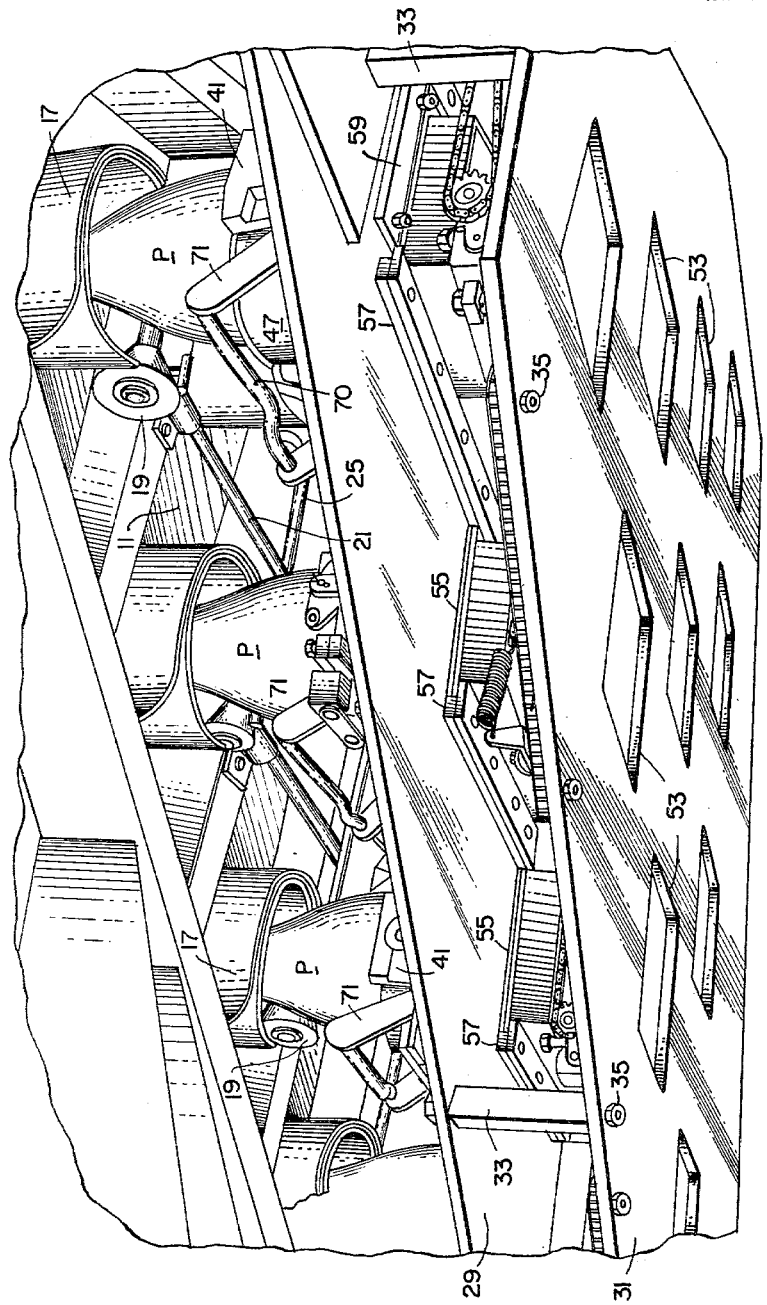
FIG. 5 is a perspective view, from below and obliquely from in front, of the upper and lower decks of the pin setter, with pins delivered from the storage deck thereto.
Figure 12:
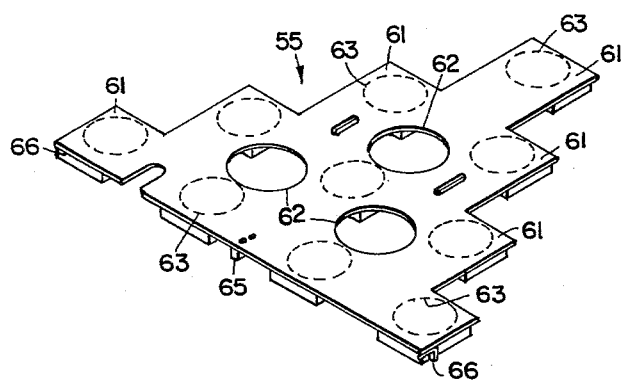
FIGS. 12 and 13 are perspective views of the shutter, respectively from above and from below.
Figure 13:
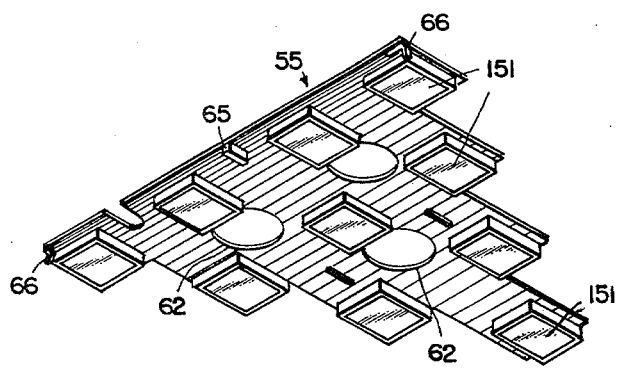

When the pins fall into these cups, their bottoms land on the flat and horizontal upper surface of a retractable member 55, FIGS. 12 and 13, slidably mounted in guideways 57, FIG. 5 on the under side of the upper deck 29, so that when the member 55 is advanced until arrested by the stop 59 bolted to deck 29 its stepped or salient portions 61 and certain intermediate areas shut the ports 30 in deck 29, these ports respectively overlying the portions 61 and intermediate areas in the manner indicated by the dotted circles 63 in FIG. 12. This retractable member or "shutter" 55 is preferably made of two coextensive sheets of steel with a layer of sound-deadening plastic sandwiched between. A lug 65 affixed to the shutter near mid-width of its rear edge provides for attachment of the means, described hereinafter, for sliding the shutter back to open the ports 30 in the upper deck 29, while coil springs attached to lugs 66 and anchored to the deck 29 return the shutter, to close the ports 30.

When the shutter 55 is withdrawn to open the ports, the pins standing thereon, being sustained only by their bottoms resting on the shutter, slide down the sleeve 47 and through the ports 30.

Before the ports 30 are fully opened by the shutter, and thus before the pins descend through the ports 30, means to grasp the pins by their necks and arrest their descent come into action. Such means are shown in FIGS. 6-11, and comprise a pair of swinging yokes 70 for each port 30, pivotally mounted by their arms 71 upon studs 73 fixed in the bases of the lugs 41 of the frames 37 in diametrically opposite relation. The two members of each pair are linked together to move in unison by a link 75, FIG. 7, pivoted to the arm 71 of the left-hand yoke 70 at 77 and to an actuator 79 at 81, the actuator being pivoted on a stud 83 fixed in one lug 41 and having a stud 85 fixed on it whereby it is rocked to open and shut the yokes, by means to be described, while the right-hand arm 71 is coupled to the actuator 79 by a link 87 pivoted to the yoke at 89 and to the actuator at 91.

When the actuator 79 is rotated clockwise about its pivot 83 by means of stud 85 and the means to be described hereinafter, the two yokes 70 swing from their open relation shown in FIG. 10 toward their closed relation shown in FIGS. 6-9. The yokes 70 are timed to close simultaneously upon the convex sides of the pin from opposite sides before the bulge of the pin slips past the edge of the supporting areas on the shutter, and thus before the pins escape such restraint. When closed, the space between each pair of yokes 70 at mid-length thereof is greater than the diameter of the neck of the pin at its narrowest point, but less than the diameter of the handle or head of the pin. Accordingly, the pin is permitted to slide down a couple of inches after the minimum diameter of its bulge passes the shutter 55, until the increasing diameter of the upper neck portion matches the space available for the neck between the closed yokes.

Thus each pin is held suspended by its neck with its axis truly vertical, and centered in the ports 30 and 53 and coaxial with its pin spot on pin deck A, the pin having descended about 6 inches.

The interval between the two decks 29 and 31 is made such that when the pin is thus held in pendent relation its bottom end is substantially one inch below the level of bottom deck 31. Since the descent of these two decks of the pin setter is being slowed down as the pads 93, FIGS. 1 and 2, make contact with and rest upon the pin deck A, the pins are actually placed upon the spots by the pin setter without any drop or significant impact, and in truly vertical relation, avoiding any tendency to tip over. The fact that the yokes 70 are spaced so as to support the pin above the narrowest point of its neck enables the pin to land on the pin spot before the pin setter has finished its descent, as the neck is free to slide up through the yokes. The yokes have thus completed their supporting function before they are opened. The latitude thus afforded the pin in the yokes 70 avoids the necessity for accurate timing of the release of the yokes from the pin with respect to the descent of the pin setter.

The yokes 70 are opened as the pin setter starts to rise, by counter-clockwise rotation of the actuator 79 effected through pin 85, the yokes reassuming the positions shown in FIGS. 2 and 10 to admit another set of pins from the storage deck 11 to the cups formed by the sleeves 47 when a fresh set-up is initiated by the player as in our prior application cited hereinabove, or automatically, as hereinafter.

Figure 7:
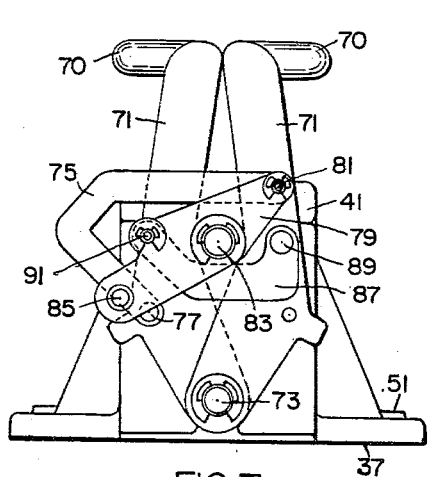
Figure 8:
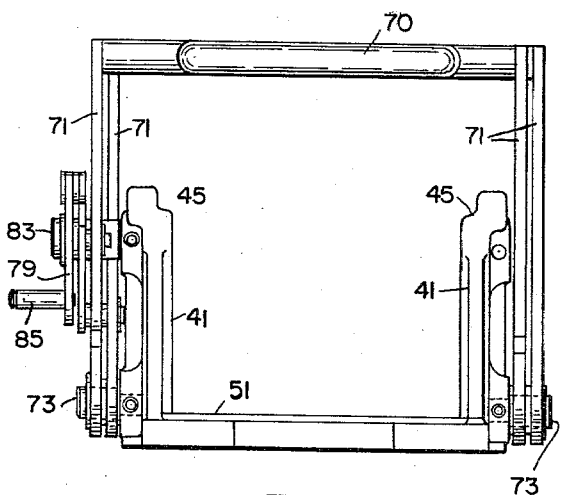
Figure 7A:
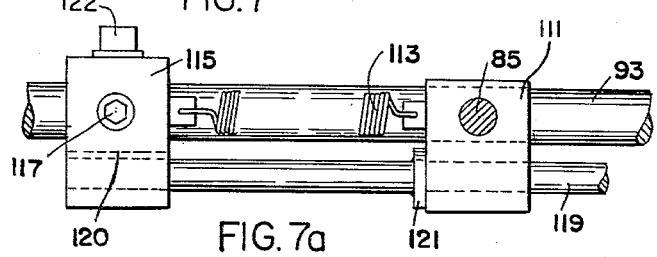
FIG. 7a is a detail of the actuating means for the stabilizing yokes.

The actuators of all the yokes are worked simultaneously and automatically by the means shown in FIGS. 6 and 7a. Transversely extending rods 93 are slidably mounted in bearings on stands 95 fixed on top of deck 29, and fixedly connected by yokes 97 with a rigid framework of bars 99, the whole assembly being shiftable transversely of deck 29 in yieldable manner by contracting springs 101 attached to yokes 97 and anchored on the stands 95, to open the yokes, and reversely to close the yokes by the pull of a chain 103 passing around a sprocket 105 and idlers 107, and attached through pull-spring 109 to the framework made of members 99. The pin 85 of each actuator 79 for each pair of yokes 70 has mounted on it a swivel block 111, FIGS. 6 and 7a, connected by a pull-spring 113 with a block 115 swivelling on a screw 117 in a yoke 120 clamped by screw 122, FIG. 7a, on one of the rods 93, a push-rod 119 fixed in block 115 having a shoulder 121 to engage the swivel block 111. Thus when the assembly is shifted in the direction to stress springs 101, by tension applied to chain 103 by means described later herein, the actuators 79 are yieldingly rotated in clockwise direction by springs 113 to close the yokes 70, and when the assembly is allowed to move back under the pull of springs 101 upon relaxation of the tension applied to chain 103 the yokes are opened by the shoulders 121 on push-rods 119 engaging with the swivel blocks 111 on pins 85 and rotating the actuators 74 counter-clockwise, as viewed in FIG. 7.

The yokes of each pair are made to lock about the neck of each pin by the manner of linkage shown in FIG. 7. There, just after the yokes 70 meet, the line joining the centers of pins 89 and 91 passes the center of pin 83, locking the toggle joint thus formed, and the same locking action occurs with respect to the line joining the centers of pins 81 and 85 with respect to the center of pin 83. The push of rods 119 unlocks the toggles without difficulty, under the impetus of springs 101.

The pins P are released by the yokes 70 to remain standing on the pin deck the moment the pull of chain 103 is relaxed.

These yokes 70 also serve as stabilizers for the pins as they descend into the cups defined by sleeves 47 and the underlying portions of shutter 55, by standing them up and holding them with their axes vertical if they have any tendency to be tilted after being dropped in. Thus they are set down without any tendency to wobble. The diamond shape of the aperture between the yokes, seen in FIG. 9, centers the neck on the axis of the sleeve 47.

The stops 19 are returned to their inward position as the shutter completes the opening of ports 30, and the shutter returns to closed position just before the pin setter reaches its highest position.

PIN RESPOTTING MEANS

The improved devices for raising the pins left standing after the first ball is bowled, so that the fallen pins may be swept away, and then for replacing them precisely, are shown in FIGS. 2 and 14-19. Each port 53 in lower deck 31 is rectangular, and large enough to encompass the head of a standing pin in whatever position of deviation from its spot the pin many reasonably be expected to assume after play and without falling. Two opposing straight-edged jaws 125 are slidably mounted, with their confronting edges in parallel relation, by means of their sleeves 127 upon a guide rod 129 fixed on grooved spacer blocks 131 by caps 133, FIG. 17, and cap screws 135 put through the parts and threaded into the deck 31. The guide rod 129 is disposed parallel to the front side of the rectangular port 53, and a companion guide 139 is provided at the opposite side of each port 53, along which the forked end 141, FIGS. 16 and 17, of each jaw 125 slides. Guides 139 are continuous past a plurality of ports 53, except at the port for the No. 1 pin of the set, and are elevated on spacers 143.

These jaws 125 are normally held apart, and outside the margins of the ports 53, by wishbone type expanding springs 147 having their extremities formed into eyes looped around cap screws 149 fixed in the respective sleeves 127, the springs lying parallel to deck 31.

Figure 18:
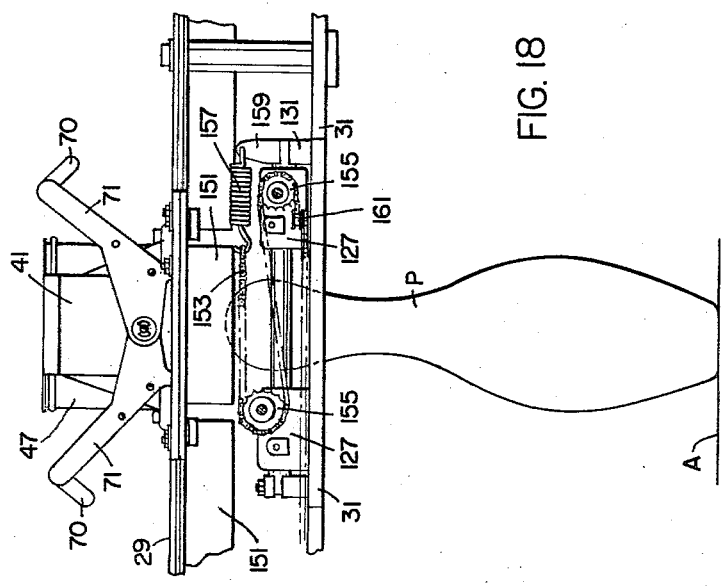
FIG. 18 is a front elevation showing the retrieving mechanism about to close on and raise a standing pin.

To pick up the standing pins, the shutter 55 which has been restored to its port-closing position is left so and the pin setter is lowered from its normal raised position well above the heads of the pins, until as shown in FIG. 18 the lower deck 31 stands about 11 inches above the pin deck, and the heads of the pins enter the rectangular ports 53 and are engaged by sponge rubber pads 151 fixed to the under side of the portions of shutter 55 which underlie the ports 30 in the upper deck 29, the pads thus pressing the pins down firmly against the pin deck, and "freezing" them in place to guard against displacement by the closing jaws 125. The descent of the pin setter is stopped in this position, which brings the jaws 125 about 3 inches below the tops of the standing pins. Thereupon the jaws are closed, by means next described, to grip the heads of the pins, below their maximum diameter, from both sides and carry the pins up clear of the sweep which sweeps away the deadwood, as the pin setter is again raised.

Figure 19:
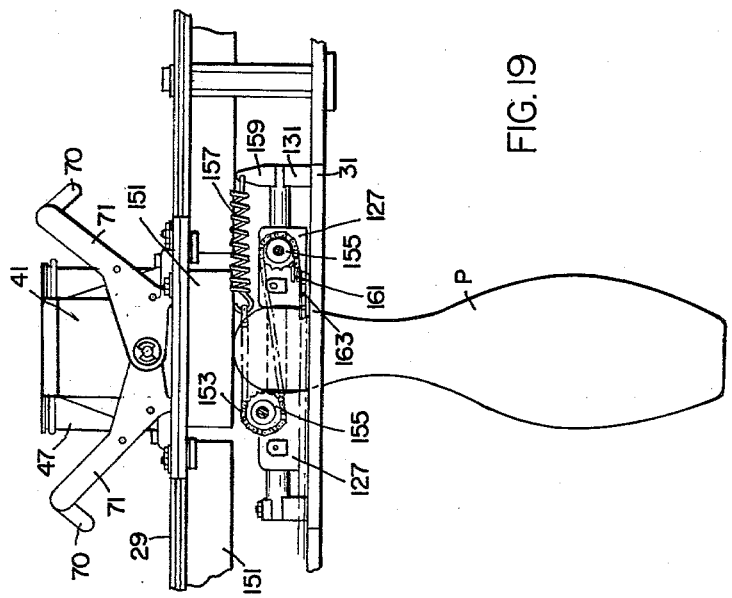
FIG. 19 shows the parts of FIG. 18 holding the pin clear of the alley surface, for sweeping away the deadwood.

To close the jaws upon the heads of the pins without displacing the latter, a flexible element, herein the chain 153, FIGS. 18 and 19, is wrapped around idler sprockets 155 serving as pulleys and rotatably mounted on the respective sleeves 127, FIGS. 15 and 17, of each pair of jaws 125, one end of the chain being attached to a contracting coil spring 157 hooked through a hole in a bracket 159 mounted under the cap 133, FIG. 17, which holds one end of the guide rod 129 in place. The other end of each chain is attached at 161 by a suitable biplanar coupling block to the top surface of a lengthy flexible element or chain 163, FIG. 14, which zigzags back and forth transversely of the lower deck 31 across the front of all ten of the ports 53, changing its direction around idler sprockets 165 rotatably mounted on the deck, and its end is attached to the chain 153 of the No. 1 pin port by a bi-planar block. When tension is applied to the chain 163, by means to be described, the pull transmitted to each short chain 153 by reason of its attachment to chain 163 draws both sprockets or pulleys 155 and consequently both sleeves 127 and their jaws 125 toward each other until stopped by engagement with the intervening head of the pin. The tension applied to chain 163 and the consequent grip of the jaws 125 is maintained while the pin setter rises and thus elevates the pins clear of the sweep, dwells while the sweep completes its action, and then again descends until the pins are again grounded and respotted on the pin deck precisely where they stood when picked up. Thereupon the tension applied to chain 163 is relieved and the wishbone springs 147 reopen the jaws and release the pins. Then the pin setter again rises to clear the way for the bowler's second ball.

Thus contrived, the pick-up jaws 125 are enabled to grip a pin whose head is located in any position within the area of the port 53 without the creation of any substantial force tending to tip or displace the pin. The two jaws of each pair are urged transversely of the lane toward the head of the pin by the same, and hence equal, force, yet each moves independently of the other and stops when it engages the pin without affecting the continued travel of the other. The diverting force applied to the pin by the jaw first to engage it cannot exceed that required to overcome the slight friction incident to sliding the other jaw along its guides and to the reeving of the chain around the sprocket of such jaw, the total effect of which is negligible while the pin remains frozen by its pad 151. As is obvious, after both jaws meet the head of the pin, their forces are equal and opposite, and thus in equilibrium.

The use of the spring 157 makes the grip of the jaws on the head of the pin yielding in character, and sets a limit to the force thereof. It also avoids the need for any precise limit of travel of the actuating chain 163 in closing the jaws. By including a portion of or on each jaw within the bends or bights of a single flexible element, namely the chain reeving around the two pulleys or sprockets on the respective jaws, the invention affords a simple and inexpensive means of attaining the accuracy of respotting compelled by the very strict regulations enforced by the governing body which establishes the rules of play, under which any displaceemnt of the pins laterally of the pin deck by the respotting means which persists after replacement is not tolerated. The simplicity of the novel means is in marked contrast to the complexity of prior respotting pick-up devices, while the range of off-spot pick-up is increased to a maximum of 2¼" displacement in any direction with consequent reduction of stoppages or malfunctions requiring manual correction arising from this source. Yet the pins are gripped firmly enough by the jaws to preserve any angle of lateral tilt which might have been given the pins by the edges of the ports 53 in striking the sides of the heads as the pin setter descended, so that the pins are replaced accurately.

PIN SETTER ACTUATION

Improvements are provided herein attaining greater simplicity of construction and safety of operation in the functioning of the pin setter. In general, the mechanism shown herein is that of Patent No. 3,014,720, noted above. Thus, the three racks 171, FIGS. 1 and 3, are fixed at their lower ends to the top deck 29 of the pin setter, and extend up through guides 173 mounted on the top of storage deck 11 at the front and both sides thereof. Pinions 175 meshing with the respective racks are mounted on a transverse shaft 177 and an oblique shaft 179 which are caused to rotate in unison by bevel gears 181 fixed thereon, the racks thus being interconnected to operate simultaneously, keeping the pin setter horizontal. The transverse rack-driving shaft 177 has fixed thereon a drum 183, to which is affixed one end of a stranded wire cable 185 which is wound for several turns about the grooved face of the drum and then runs around a pulley 187 rotatably mounted on the auxiliary crank-arm 189 pivotally mounted on the main crank-arm 191 of the power unit, and rotated periodically for a single turn for the Ball 2 cycle and two turns for the Ball 1 cycle, by chain 193, reduction gearing 195, and motor PU with brake, FIGS. 20 and 21, as in the above patent, to let the pin setter descend by gravity and then raise it by power. The same means for locking the auxiliary arm in infolded relation and thus reducing the effective radius of the combined arms as is used in the patent is employed here to shorten the downward travel of the pin setter when it acts to retrieve and respot the pins left standing on the alley after the first ball is rolled. Such means comprises a spring-pressed bolt 198 in the unit 199 on the arm. This bolt 198 is withdrawn to increase the radius upon engagement with the striker 201 protruded into its path when a new set of pins is to be placed on the pin deck.

The other run of cable 185 passes over a sheave 203 rotatably mounted on a bracket 205 fixed on the right-hand side of storage deck 11, and thence enters through a guide 207 into a cylinder 209 of the cable overload release assembly and mounted by part 211 fixed on bracket 205. In this cylinder are two stiff expanding coil springs 212, one inside the other, bearing against the closed head of the cylinder and against a disk or piston 213 fixed on a hollow piston rod 214 through which the cable 185 extends freely, the cable's end being fixed in a shouldered sleeve 216 crimped on the cable beyond the piston 213. The flange of sleeve 216 bears against a bushing 218 around which is a weaker expanding coil spring 220 compressed between piston 213 and the flange of bushing 218. Normally the cable tension keeps the spring 220 fully compressed and the springs 212 unmoved.

This yielding mounting or anchorage of this end of the cable leads to several important provisions for the safety of the machine and the mechanic in charge of it. A collar 215 is mounted in fixed position on the cable in proximity to the guide 207, and a toggle switch SFS is mounted on bracket 205 so that its arm stands in the path of collar 215 and is actuated thereby to open the switch whenever an increase in tension in cable 185 compresses springs 212 and pulls the collar past it. This switch cuts off the current to the relay PUR4 and the power unit motor PU which drives crank arm 191 that alternately pulls and eases the cable to raise and lower the pin setter. Thus, if anything blocks the ascent of the pin setter, the driving of arm 191 is stopped, the springs 212 yield, the piston rod 214 moves out further if necessary to permit overrun of the parts under their momentum, and breakage of cable 185 and other parts from this source is prevented. To clear the jam, the power unit is turned backward by hand with the power off, thus relieving the excess cable tension and allowing resetting of switch SFS.

This yielding anchorage also provides against damage and physical injury in case of a jam or blocking of the descent of the pin setter. To this end, a normally open microswitch PBM is mounted on bracket 205 so that the roller 219 on its actuating plunger rests on the collar 215 and thus holds the switch closed so long as the tension in cable 185 is normal and no relative movement of the collar 215 occurs. This switch when thus closed actuates a solenoid PR which controls a one-direction driving clutch 223 applied to the oblique rack shaft 179 which acts like a ratchet preventing rotation of this and the other rack shaft in the direction to lower the racks and the pin setter but permitting rotation in the other direction. Preferably, this clutch is of the type having a spiral spring around the shaft 179 with one end anchored and the other controlled by the solenoid to grip or release the shaft. When the descent of the pin setter is checked by an obstacle, the resulting slackening of cable 185 allows the small spring 220 to expand and move the bushing 218 and the sleeve 216 fixed on the cable away from piston 213, the cable thus moving the collar 215 out of range of roller 219 on switch PBM, cutting off the current to solenoid PR and engaging the clutch 223, which results in one-way locking of both rack shafts and preventing further descent of the pin setter while the jam is being cleared. Cable 185 slides freely through the bore of piston rod 214, the piston 213 remaining unmoved against the fixed collar 222 which forms its stop. This action also occurs during the normal functioning when the pin setter engages the heads of standing pins for pick-up, and also when pins are out of range.

This arrangement of the clutch 223 likewise prevents the fall of the pin setter in the event of breakage of the cable 185, and thus is a safety feature protecting the pin setter from damage through falling, and especially protecting from injury a workman who might be working under the pin setter at the moment of such breakage. It further prevents damage to the pin setter and particularly the pick-up jaws 125 in the event that the edge of a port 53 in the bottom deck 31 of the pin setter lands on the head of an off-spot standing pin which after checking the pin setter's descent then slips into the port 53, which would otherwise let the pin setter drop suddenly to a greater or less extent.

Novel counterpoise means is provided to ease the load on the described mechanism for raising the pin setter, namely the racks and pinions, cable 185, arms 189, 191, reduction gear 195, motor PU, and associated parts. Such means is made desirable on account of the relatively heavy construction required in the pin setter by the weight of the set of heavy ten-pins. To this end, a cable 227 is anchored to each of the oblique ribs 229 at the under side of storage deck 11, and passes down and around a pulley 231 mounted at each side of the upper deck 29 of the pin setter just inside each rack 171. Each cable then passes up and over pulley 233 mounted on the under side of storage deck 11, giving a two-to-one purchase, and goes around and is fixed to the face of a drum 235 rotatably mounted on a vertical stud 239 fixed in the lug of a bracket 241 secured to the rear side of the header extending across the front end of storage deck 11, near each lateral edge thereof. This drum contains in its bottom a coiled spring steel band (not shown) having its inner end fixed to stud 239 and its outer end fixed to the wall of the drum near its rim, and acting to rotate the drum to wind its cable 227 thereonto. The two springs are initially stressed to exert sufficient traction on cables 227 to support a substantial part of the weight of the empty pin setter and its parts, and as the pin setter descends with its load of pins the rotation of the drums by the unwinding cables 227 winds up the springs ever tighter. Hence when the raising of the pin setter with or without pins is effected by the motor-driven means, the load on such means is greatly lightened by the counterpoise with its 2-to-1 purchase, with correspondingly lessened wear and tear on the mechanism and resultant longer life with fewer breakdowns and repairs, as well as with economies in first cost and power consumption through permitting the use of a smaller motor PU.

SWEEP SYSTEM

The sweep 401, FIG. 1, is of usual or preferred type extending across the full width of the alley and its gutters, preferably with downward extensions at its ends to clear pins from the gutters. It is mounted on resilient arms 403 each fixed to a carriage 405 mounted on two rollers running in a channel or track 409 in the outer side of channel girder 15 and driven by an endless chain 411. The chains are driven in unison through shaft 413, FIG. 24, and sprockets thereon, by a motor SD, FIGS. 24 and 33, and speed-reducing chain drives, the motor being stopped by capacitor braking, and being locked in its rest position by a spring-loaded disk brake of known construction built in the motor and released by a solenoid when the current is applied to the motor.

The sweep is set in motion from its elevated or home position at the front of the machine by the displacement of the swinging bumper cushion through impact of Ball 1 thereagainst, as in prior machines, such as that of Patent No. 2,977,121, herein by closing one or both micro switches BUM1 and BUM2, FIG. 32, or by a ball rising in the ball elevator tripping a micro switch BUM3 in passing, in case the ball is weakly rolled by the bowler. Any one of these switches through relays and contacts starts motor SD to drive the chains 411 and move the sweep to its first guard position (GP–1), to protect the pin setter from stray balls, a vertical position in front of the pins on the alley, by means of a stud projecting laterally from each chain and working in a slot in a link 417 pivoted on each carriage 405.

A sweep control unit SC, FIGS. 25–28, is thus brought into action. This unit is mounted on a plate 419 supported by a girt uniting the forward ends of the channel girders 15, and has a vertical countershaft 423 rotated clockwise by gears 425 and countershaft 427, worm gear 429, worm 431, countershaft 433, sprocket 435, and chain 437 from the transverse shaft 413 which drives the chains 439 driving the sprockets 441, FIGS. 1 and 24, which propel the chains 411 carrying the sweep. The shaft 423 is timed to make one revolution for each complete circuit of chains 411, a full cycle of sweep travel.

On this shaft 423 are fixed eight cams actuating eight micro switches arranged with their actuating arms in their paths (FIGS. 25, 26 and 27). Each cam is slotted and fixed to a turntable 443 (fixed on shaft 423) by a screw 445 and one or more spacers 447, the slot providing for angular shift if needed for timing changes, and these spacers and similar ones on shaft 423 hold the cams at different heights above the turntable 443, at the level of the roller-equipped actuating arms of their respective switches.

The eight micro switches are arranged at three angularly spaced locations about the axis 423 of the cam rotor. Four of these switches are stacked one above the other in the unit 449, three of them in unit 451, and one in the unit 453. Those in unit 449 are respectively the signal limit micro switch SGM (see also FIG. 31), the power unit restart micro swtich PUM, the timer start micro switch TSM, and the reset pins micro switch RPM, FIG. 32. In unit 451 are the timer release micro switch TRM, FIG. 32, the guard position micro switch GPM, FIG. 32, and the sweep limit micro switch SLM. Unit 453 contains the sweep motor brake micro switch SBM, FIG. 31. The cams which actuate the several switches are marked in FIG. 28 with the designations of the various switches which they respectively actuate. Two such symbols are borne by certain cams in FIG. 28 because two cams are located at different levels at the same angular position about axis 423. Switch GPM is actuated by different cams, and thus twice, in each sweep cycle.

The sweep drive is controlled by a four relay sequence through signals from the sweep control and power unit selector. One of these relays, SDR4, FIG. 31, actuates the sweep drive contactor SDC1 to start motor SD and release the brake. When the sweep cycle is started by the energizing of signal hold relay SGR1 by the closing of a bumper switch BUM1, FIG. 32, or BUM2 or ball elevator switch BUM3, sweep drive relay SDR1, FIG. 31, is energized through SGR1–6/7 contacts (the contacts of SGR1 numbered and 7 in FIG. 31). SDR1–7/8 contacts close to energize relay SDR4, which through SDR4–4/5 contacts close contractor SDC1 and supply power to the sweep motor SD. A holding circuit for SDR1 is completed through SDR1–1/3 and SDR3–5/6. Signal hold relay SGR2 was energized immediately upon the start of the sweep cycle through SGR1–13/14 contacts, and SGR2–10/12 contacts energize sweep drive relay SDR2 through normally closed GPM. This relay, through SDR2–7/8 and SDR4–1/3 contacts, locks in relay SDR4 after relay SDR1 drops out. Sweep limit micro switch SLM in the sweep control SC comes off its actuating cam where it has been resting, and the SLM–N/C (normally closed) contacts complete a holding circuit for relay SGR2, which is held for the duration of the cycle (until the machine is ready for the next ball). Immediately after the holding circuit for SGR2 is completed, signal limit micro switch SGM is actuated momentarily by its corresponding cam in the sweep control, and the SGM–N/C contacts then open to break the circuit to relay SGR1 and it drops out.

Relay SDR1 holds itself in over SDR1–1/3 contacts until dropped out by the opening of normally closed SDR3–5/6 contacts. This will occur when both relays SDR2 and SDR4 are energized, closing SDR2–1/3 and SDR4–7/8 contacts.

When the sweep reaches GP–1, micro switch GPM in the sweep control unit SC opens to de-energize relays SDR2, SDR3, and SDR4, which latter de-energizes contactors SDC1 and SCC, initiating capacitor braking action. (Since relay SDR1 has already dropped out, relay SDR4 cannot be held by SDR1–7/8 contacts.) As already indicated, the sweep drive brake solenoid SB is de-energized when the sweep drive motor SD is turned off, and the springs apply the brake to arrest further movement of the sweep drive. At this point, the pin setter lowers to pick up standing pins.

Figure 29:
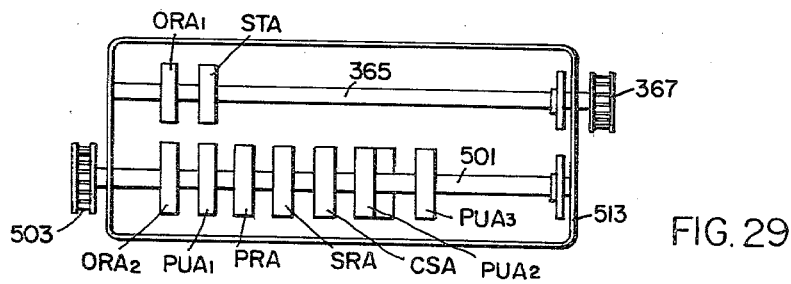
FIG. 29 shows in plan view the power unit selector with its cams, the contactors which they actuate being omitted.
Figure 30:
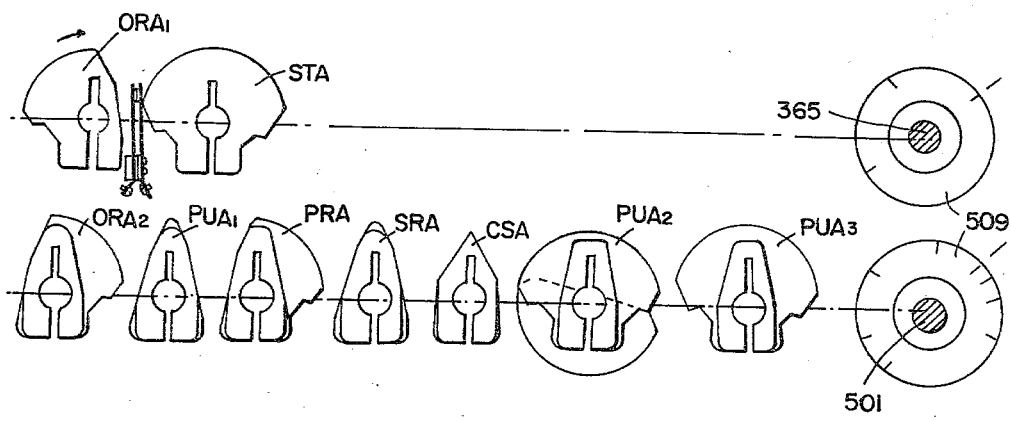
FIG. 30 shows in profile the cams of the selector of FIG. 29.
Figure 34:
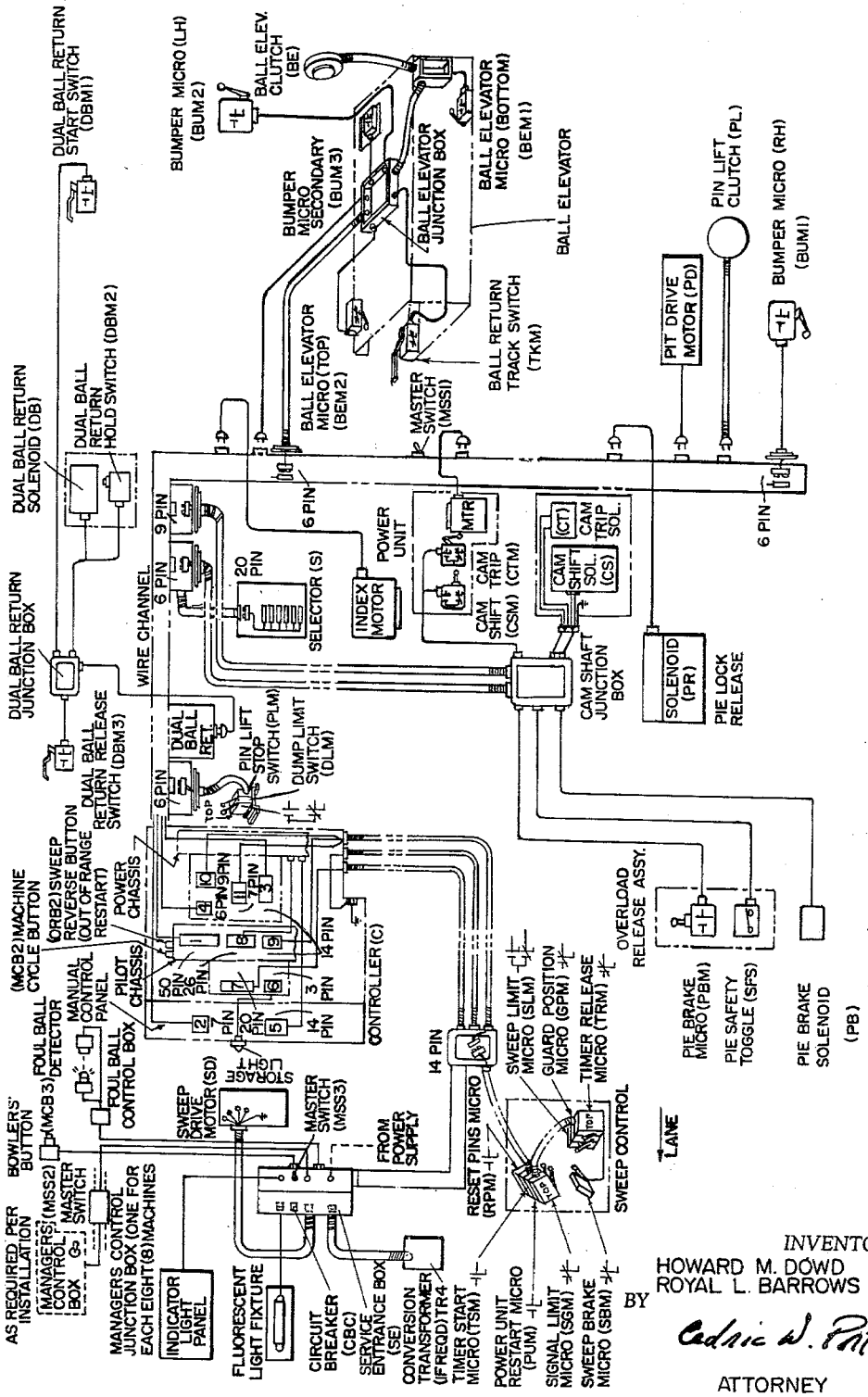
FIG. 34 shows the general arrangement of the electrical system.
Figure 35:
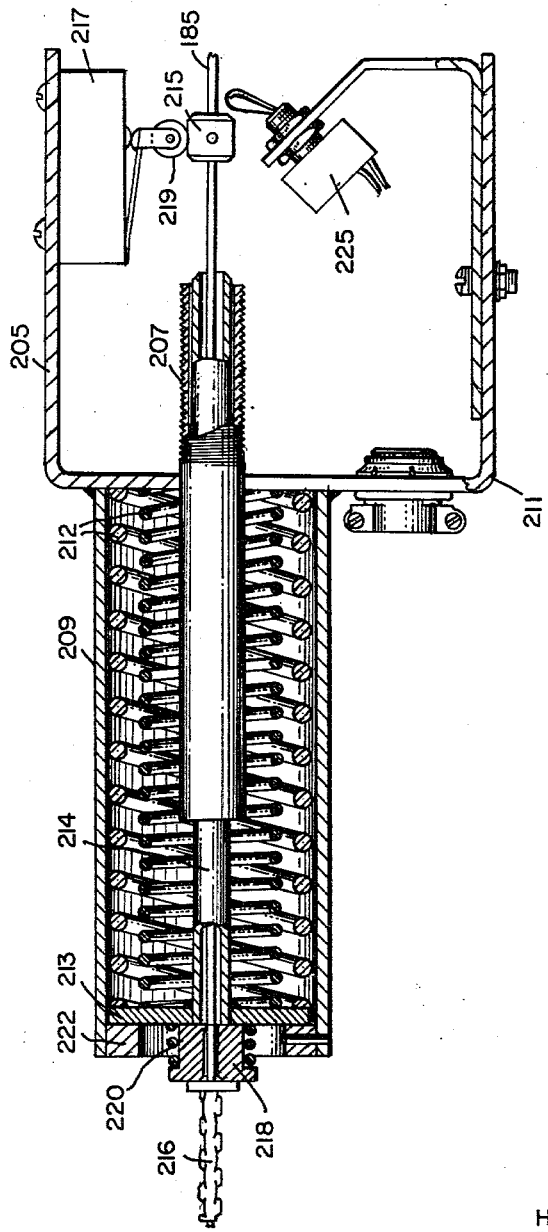
FIG. 35 is a detail, partly in section, of the cable anchorage of FIG. 1.

On this Ball 1 cycle, whenever the pin setter rises, with or without pins, the sweep restart cam and switch SRA, FIGS. 29, 30, 31, in the power unit control or "selector," FIG. 29, to be described, close to energize relay SDR1 and the sweep motor is started again. Before the first sweep control cam GPM moves away from the GPM micro switch still open, relay SDR2 will be energized. This delays the energizing of relay SDR3 over SDR2–1/3 contacts until after GPM closes. Relay SDR4 will now be held in over SDR2–7/8 and SDR4–1/3 contacts. This assures that the sweep motor SD will continue to run after SDR3–5/6 open and drop out SDR1. Relay SDR4 is now locked in as before until micro switch GPM opens again. When the sweep reaches GP–2, micro switch GPM is once again opened by the second GPM cam and the sweep drive stops as before in guard position.

On the Ball 2 cycle the sweep stops again at GP–1. Since there are no pins to be picked up, the pin setter remains in its home position with the cams in position to deliver new pins, and therefore new pins relay NPR1 is energized and NPR1–16/17 contacts are now closed. After the sweep left home position the timer start micro switch TSM in the sweep control SC closed, initiating action of the timer delay relay TMR and energizing timer pilot relay TPR. As the sweep reaches GP–1, the guard position micro GPM in the sweep control SC is actuated, dropping out sweep drive relays SRD2, SDR3, and SDR4. SDR3–5/6 contacts are now closed. Shortly after this moment relay TMR completes its time delay action and closes contacts TMR–1/5. The circuit to relay SDR1 is now complete through SDR2–5/6, NPR1–16/17, and TMR–1/5 contacts, and the sweep drive is restarted as in the Ball 1 cycle. The sweep then moves from GP–1 to GP–2 at which point guard position micro switch GPM in the sweep control SC is opened and the sweep stops. The timer delay relay TMR and the timer pilot relay TPR, which were held in through TPR–1/3 contacts, are dropped out by the opening of micro switch TRM on the sweep control, as the sweep travels from GP–1 to GP–2.

When the pin setter rises after setting pins, the sweep restart contacts SRA in the power unit control again close to restart the sweep drive as before. When the sweep reaches home position, micro switch SLM opens, de-energizing signal hold relay SGR2 which in turn de-energizes relays SDR2, SDR3, and SDR4, initiating the capacitor braking circuit described. The sweep coasts to its home position, at which time micro switch SBM de-energizes the motor brake release solenoid and the disc brake is applied, locking the sweep in the home position.

POWER UNIT

Restating briefly the operations detailed above, the pins dropped into the storage deck by the index or collector are in turn dropped into the cups of the pin setter by withdrawing the stops of the storage deck, then the shutter is pulled out from under the pins and the latter are seized by their necks by the stabilizing yokes as the pin setter descends, and the pins are released by the yokes as they reach the pin spots. After the first ball is rolled, the pin setter descends partway and the pick-up jaws grip the standing pins, the pin setter again rises, the sweep clears the deadwood, the pin setter again descends until the lifted pins reach the pin deck, and the jaws are then opened, whereupon the pin setter again rises and the second ball is rolled. This completes the normal action of the machine for each frame bowled, following which the sweep clears the deck and a new set of pins is put in place. In case of a strike, the re-spotting step is omitted. The mechanical means for effecting these operations in timed sequence are now to be described.

The power unit for actuating the pin setter and its appurtenances and releasing the stored pins thereto is related to that of Barrows Patent No. 3,014,720 and our Patent No. 3,063,716, above. The shaft 251, FIGS. 20 and 21, which is driven from motor PU and carries the crank arm 191 raising and lowering the pin setter, is coupled directly to an aligned splined cam-shaft 253 on which is slidably mounted a cluster or unit of cams LC1, LC2 and LC3, and a separate cam LC4, the cluster being splined to match the shaft and rotate with it. Cam LC4 which effects the pick-up of standing pins is mounted with capacity for angular adjustment, on the side of a flange on a sleeve 255 splined to the shaft 253 and slidable therealong by a fork 257 fixed on a rockshaft 259 in bracket 261 on the base 263, an arm 265 fixed on the rockshaft being linked to a solenoid CS. A strong expanding coil spring 269 on the cam shaft 253, and reacting against the fixed bearing support for the end of the shaft, urges the cluster and the sleeve 255 against a nylon bumper ring backed up by a collar 271 fixed on the cam shaft. A weaker expanding coil spring (not shown), is confined between the cluster and the abutting end of sleeve 255, both the sleeve and the hub of the cam cluster being recessed to receive it while letting the sleeve and the cam cluster butt together.

Cam LC1 operates the stabilizing yokes 70, cam LC2 withdraws the shutter 55 to open the ports in the upper deck 29 of the pin setter, cam LC3 withdraws the stops 19 on the under side of storage deck 11, and cam LC4 operates the pick-up jaws 125. Thus the cluster of three cams functions during the setting of the pins, and must be idle during the re-spotting, while the separate cam LC4 operates only during the pick-up and re-spotting, and must be idle during the setting of the pins.

When the pins are to be set, all the cams except LC4 occupy their working position shown in FIGS. 20 and 21, the "new pins" relation. Cam follower 273, FIG. 22, on one arm of its rocker 275 pivotally mounted on a shaft 262 fixed in stand 263 is in engagement with the periphery of its cam LC1, cam follower 277 on its rocker 279 engages cam LC2, and a cam follower 280 on one arm of bell crank lever 281 on rockshaft 283 engages the periphery of cam LC3. Cam LC4 is out of line with its follower 276 on rocker 278.

As cam shaft 253 starts to rotate to lower the pin setter through crank arm 191 pulley 187, and cable 185, all the cams are rotated. The lower end of the arm of bell crank 281 shown in FIGS. 20 and 22 is attached by a yieldable link 284 and swivel joints to the end of the extension 27, FIGS. 4 and 22, welded to the rear bar of the framework uniting all the stops 19. While cam shaft 253 rotates from 3° to 40° from its starting position, cam LC3 rocks the bell crank in the direction to pull rearwardly on extension 27, retracting the stops 19 and dropping the pins from the storage deck into the cups 47 of the upper deck 29 of the pin setter, where they rest upon the shutter 55. Spring 282, FIG. 22, biases the linkage to return the stops, between 106° and 126° of camshaft rotation. At 42°, cam LC1 starts to close the yokes 70, its follower 273 and rocker 275 pulling on chain 299 attached to the latter, running over a pair of the idlers 301, 302 mounted on the base 263 on the storage deck 11, and around one of the idlers 303 on the stud shaft 285. This stud shaft is at the elbow of the link frame or "compensator" 287 pivoted to the storage deck upon stud shaft 288 and to the upper deck 29 of the pin setter on a stud shaft 290 fixed in bracket 295 and serving to keep this and the other cam-actuated chains tight during the reciprocation of the pin setter. Chain 299 goes around one of several idlers on shaft 290 and thence around and is fixed to sprocket 305 to rotate sprocket 105, FIGS. 22 and 23, rigid therewith, around and fixed to which latter is the chain 103 which pulls the framework 99, FIG. 6, sidewise and closes the yokes 70 upon the pins just above their points of maximum diameter, the pins sliding down in the yokes until held by their necks as the yokes close completely and lock, at 87°. The pair of sprockets 105, 305, rotate freely between spacers on stud shaft 293 fixed in bracket 295 fastened to the rear edges of the decks 29, 31 of the pin setter.

Figure 23:
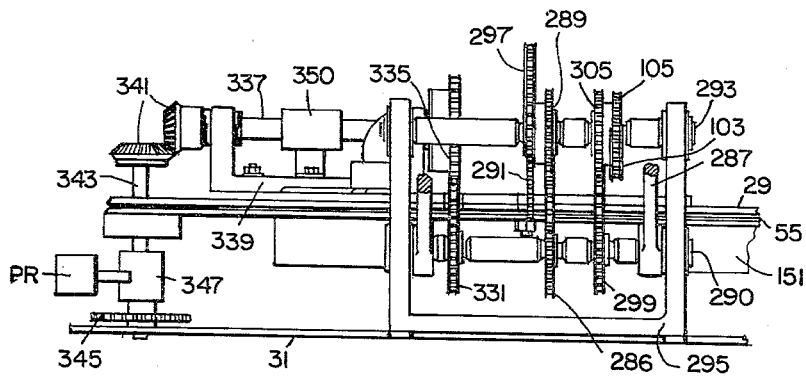
FIG. 23 is a rear elevation of certain of the parts of FIG. 22.

At 65° rotation of the cam shaft, cam LC2 pulls the shutter 55 rearward by means of chain 286 attached to the arm of its rocker 279, the chain passing around a pair of the idler sprockets 301, 302, on the storage deck, an idler sprocket on the stud shaft 285 of the compensator and one on shaft 290, thence around and fixed to sprocket 289, FIGS. 6, 23, to rotate sprocket 291 rigid therewith, the pair rotating freely on shaft 293. Companion chain 297, around and fixed to sprocket 291, is attached to the block 65, FIGS. 12 and 13, and thus the shutter 55 is pulled out from under the pins. Cam LC2 holds the shutter in open relation until the cam shaft reaches 290°, when the springs attached at 66 to the rear corners of the shutter return it to closed position at 330° of the revolution of the cam shaft.

The yokes 70 hold the pins until the pin bottoms reach the pin deck, starting to open at 170°, just before the pin setter reaches the pin deck, the yokes returned to their spread relation of FIG. 10 at 202°, and remaining so until the next pin-setting cycle.

The cam shaft and the crank arm 191 thereafter complete their 360° rotation, and the pin setter rises and dwells in home position while the first ball is rolled at the pins thus set on the pin deck.

The fourth cam LC4, separate from the cluster, remains as noted out of line with its follower 276 on rocker 278, and hence inoperative, while the other three cams are dumping the pins from storage, catching them by their necks, standing them on the pin spots and releasing them, during the descent of the pin setter and its return home.

The full downward travel of the pin setter from its home position clear to the pin deck to set new pins is as already noted attained as in Barrows Patent 3,014,720, above, by withdrawing bolt 198 to release auxiliary crank arm 189 so as to swing out from crank arm 191 and increase the effective radius of the arc of travel of the pivot of pulley 187. The striker 201, FIG. 21, which engages the roller 315 on bolt 198 as the latter starts upward at the beginning of the rotation of the crank arms, diverts the roller radially outward and withdraws the bolt 198 from locking relation, freeing the auxiliary arm 189. This striker 201 is on the end of a rod 317 sliding in guides in bracket 319 which supports the bearings for main drive shaft 251. The rod is fixed in coaxial relation to one end of a smaller rod 321 fixed at 323 to a collar 325 carried loosely in a groove in the cluster of cams LC1, LC2, LC3. This composite structure of rods 317 and 321 is called the shift shaft. When the cluster is in its home position shown in FIGS. 20 and 21, the collar and shift shaft hold the striker 201 in the path of roller 315, and thus bolt 198 is withdrawn and the pin setter is allowed to make its full downward travel to set the pins.

But when the pins left standing after the first ball is rolled are to be picked up by jaws 125 on lower deck 31 to allow sweeping of the deadwood, solenoid CS, FIG. 21, is actuated by latching relay CSR, FIG. 32, through cam shift solenoid contactor CSC closed by the cam CSA in the power unit selector, FIGS. 29 and 30, to be described, to start a different cycle by drawing down arm 265 of fork 257, the fork shifts sleeve 255 and the cam cluster to the right in FIG. 20, and the collar draws the shift shaft to the right, thus moving striker 201 out of range of the roller on bolt 198, leaving the auxiliary arm 189 locked in its infolded position, and also closing a cam trip micro switch CTM alongside the shift shaft. With the radius of arms 189 and 191 thus reduced, the pay-out of cable 185 by the diminished orbit of pulley 189 is lessened, and the descent of the pin setter terminates just below the heads of the standing pins, as the crank arm 191 arrives at 180° from its starting point shown in FIG. 21.

The shift of the sleeve 255 and the cam cluster to the right has carried all three cams LC1, LC2, LC3 out of range of their followers, thus depriving the stops 19 on the storage deck, the shutter 55, and the stabilizing yokes 70 of actuation during this second cycle of crank arm 191. But it brings cam LC4 into range of its follower 276, FIG. 22, on lever 278, on the other end of which is rotatably mounted a sprocket 329 running in a bight of a chain 331 anchored at 333, running around idlers 301, 302, 303, and one on shaft 290, and thence to sprocket 335, FIGS. 6 and 23, around which it is wrapped partway from below, with its end affixed thereto. This sprocket 335 is fixed on a jackshaft 337 carried in bearings in a stand 339 fixed on top of the upper deck 29 of the pin setter, and drives through bevel gears 341 a vertical shaft 343 mounted in bearings respectively in the upper and lower decks 29, 31 of the pin setter.

Figure 14:
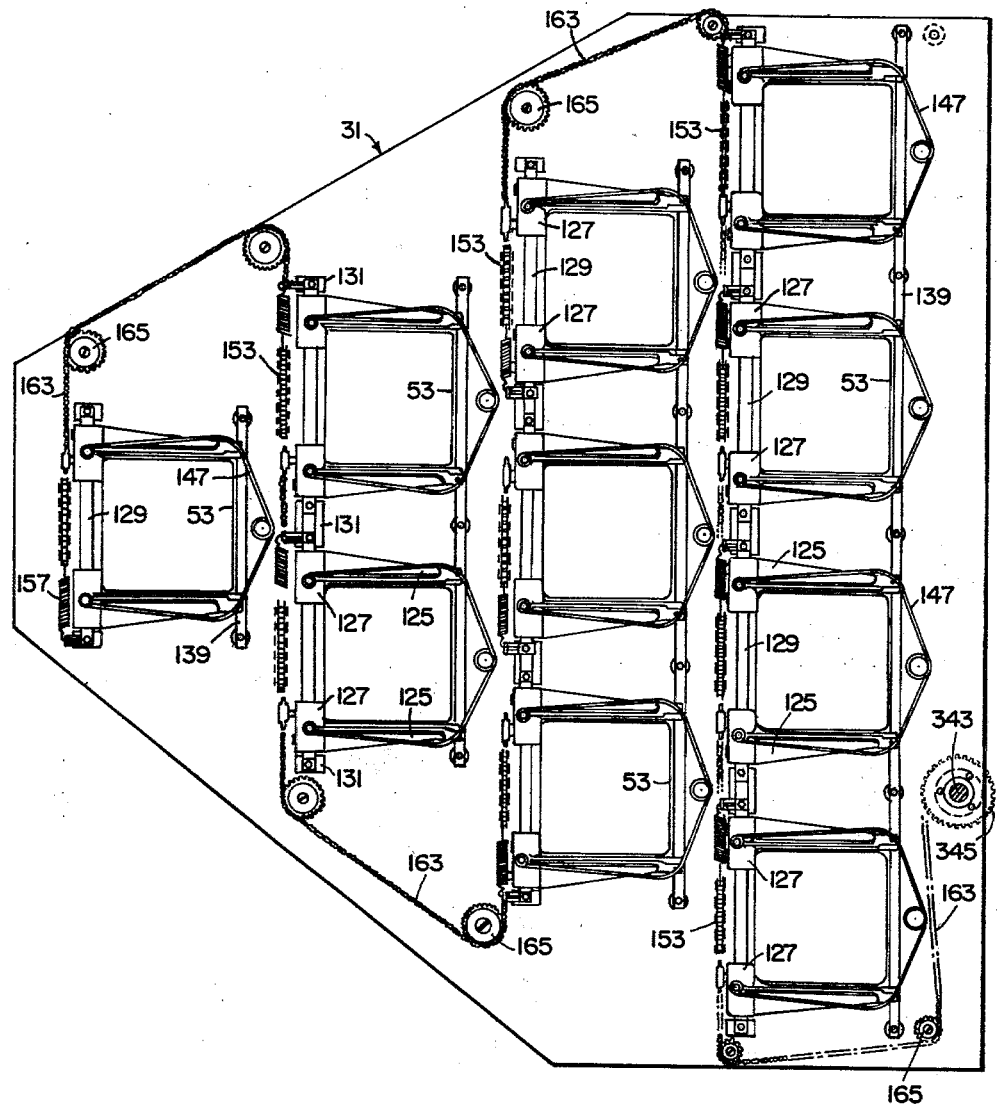
FIG. 14 is a top plan view of the lower deck of the pin setter, showing the retrieving jaws and their actuating means.

The chain 163, FIG. 14, which closes the jaws 125 that pick up the pins by their necks goes partway around and is fixed to a sprocket 345 fixed on shaft 343 just above the lower deck 31 of the pin setter. So when cam LC4 rocks its follower lever 276, the resulting rotation of sprocket 345 pulls the chain 163 and closes the pick-up jaws on the necks of all pins standing in position to enter the ports 53 in the lower deck 31. This occurs as the pin setter reaches the bottom of its shortened excursion, with auxiliary arm 189 locked, cam LC4 pulling the chain from 145° to 215° rotation of the cam shaft 253 and the crank arm 191, springs 157, FIGS. 10–19, on the ends of chains 153 yielding as needed.

To keep the jaws 125 in tightly gripping relation upon the pin necks while the pin setter rises and dwells to lift and hold the standing pins clear of the sweep in its movement to push the deadwood from the alley and gutters, and during the descent of the pin setter to re-spot these standing pins, a brake or lock 347 is applied to the shaft 343 above the sprocket 345, such brake preferably being like the one 223 on the rack shaft 179 and being controlled by a solenoid PR so as to prevent recoil of chain 163 under the force of the many springs on the jaws and secondary chains 153. This brake is kept on until the pins are again restored to their positions on the pin deck, and then is released by energizing the solenoid PR. Since two revolutions of the cam shaft, and two trips of the pin setter are required for the pick-up and re-spotting, the cam LC4 cannot serve to keep the jaws closed till the pins are re-set, and hence the brake is required.

A drag 350 which exerts a constant friction on shaft 337 is also provided, to prevent sharp recoil of chain 163 when brake 347 is released, lest the tension produced in this chain by the manifold springs cause it to overrun, and fly off of its sprocket 165. A spring 266, FIG. 22, is applied to arm 278 to keep chain 331 taut while follower 276 is off its cam.

Cam LC4 must be put out of action during the second revolution of the cam shaft to prevent its interfering with the release of the pins from the pick-up jaws at the bottom of the second descent of the pin setter during the re-spotting cycle. Otherwise it would be acting again to close the jaws at the moment when they need to be released. For this purpose, solenoid CS is de-energized, and the spring (not shown) confined and compressed within and between the hub of the cam cluster and the recess end of sleeve 255 pushes the sleeve 255 away from the cam cluster, to the left in FIG. 20, with corresponding reverse movement of yoke 257 and lifting of the armature 267 of the solenoid. This puts the segmental cam LC4 on sleeve 255 out of line with its follower 276. But to keep the cam cluster from following the sleeve 255, thus bringing cams LC1, LC2 and LC3 into unwanted action, a stop 351, FIG. 21, fixed on rod 321 of the shift shaft connected to the cam cluster is intercepted by a dog 353 normally raised into its path. And adapted to be retracted to release the shift shaft by a solenoid CT which is actuated at the end of the cycle and after solenoid CS is de-energized. Thus the cam cluster is held in its displaced position, with its right-hand end against the yieldingly mounted stop screws provided in connection with the bearing block for the end of cam shaft 253, until the pin setter completes its second shortened trip and the re-spotting operation is completed. Thereupon solenoid CT is energized, stop 351 is released, and the cam cluster resumes its initial position of FIGS. 20 and 21, awaiting its next occasion to function in providing a new set of pins after the bowler has rolled his second ball at the re-spotted pins.

As a novel and advantageous feature of our machine, in the event that a standing pin has taken an out-of-range position where its head fails to enter one of the ports 53 during the pick-up cycle, the stoppage of the pin setter's descent several inches short of its intended travel by the lower deck 31 hitting the head of this out-of-range pin leaves closed a sensor switch ORA1, FIG. 31, actuated by a cam ORA1, FIGS. 29, 30, in the power unit selector assembly, described next, on a cam shaft 365 oscillated in synchronism with the movement of the pin setter through an angle of 330°, by a toothed timing belt and pulleys 368, FIG. 3, from a gear 369 meshing with one of the rack pinions 175. When the cam ORA1 does not make its normal swing, this switch remaining closed sets the controls (to be described) to stop the motor PU when the pin setter reaches the top of its rise in this first trip of the re-spotting cycle, with omission of the second trip. The attendant responds to the out-of-range signal, a yellow light, by removing the deadwood by hand, while the sweep stays down in guard position to protect him, the sweep motor being actuated reversely by a manual control after he has finished. In prior machines, this out-of-range contingency left the machine stopped with the pin setter resting on top of the out-of-range pin, and the attendant had to crank the machine backward by hand to raise the pin setter and then reach or crawl in to remove the deadwood by hand, at risk of personal injury from a second ball from the bowler because the backward cranking had returned to the sweep from guard position.

When the bowler makes a strike and all the pins are down, the resulting 2 inches or so of extra downward travel of the pin setter, allowed by the cable beyond the point where it is ordinarily stopped by a pin head engaging one of the pads 151 underneath the shutter 55 on its first descent, the pick-up trip, of the re-spotting cycle, turns the cam shaft 365 through an angle greater than normal during this cycle and causes another cam, the strike cam STA, on this shaft to close its corresponding switch STA, FIGS. 29, 30, 32, which activates solenoid CT and energizes strike relay STR and strike indicator relay SIR. This lets the cam cluster shift back into operative relation, so that the pin setter's second or pin-replacing downward excursion of the initiated respotting cycle is changed to a full-length trip with a full set of new pins which are desposited on the pin deck.

Thus, when the pin setter's descent is shortened by an out-of-range pin the pin setter rises and stops at the top, and when it is lengthened by the absence of all the pins it omits the re-spotting cycle and instead sets up a new stand of pins.

It may be noted here that the return of the cams to their original left-hand position of FIGS. 20 and 21 is also effected by the bowling of the second ball of a frame or box, in a manner to be described, to provide a new set of pins for the next frame, just as in the case of a strike.

POWER UNIT SELECTOR

This selector assembly, shown in FIGS. 29 and 30, controls through a variety of cams, contactors, and relays the various functions of the machine in relation to the movements of the pin setter, by the connections indicated in wiring diagrams, FIGS. 31–33.

It includes the oscillating cam shaft 365, just described as carrying the out-of-range cam ORA1 which actuates its corresponding contactor type switch to stop the power unit PU when a standing pin is out of reach; also, the strike cam and its cooperating switch STA.

The selector unit also includes a cam shaft 501 rotated by a toothed pulley 503 and correspondingly toothed timing belt from a toothed pulley 507 on the end of the splined shaft 253 on which the cams LC1–LC4, FIGS. 20, 21 and 22, are mounted. This rotating cam shaft 501 is driven at a one-to-one ratio from cam shaft 253.

On cam shaft 501 is fixed a series of seven cams each operating a corresponding contact maker type switch capable of actuating their respective relays. The first cam and switch, that nearest the pulley 503, is a second out-of-range switch ORA2, in series with ORA1, which completes the circuit through ORA1 to close the out-of-range relays and thus omit the second descent of the pin setter in the Ball 1 cycle if the pin setter has been stopped short of its intended travel by an out-of-range pin, as described. The rest of the cams and their switches, the latter not shown but like STA, are respectively (2) the power unit relay PUA1 which controls relay PUR5; (3) the cam PRA and switch controlling the contactor PRC which energizes the solenoid PR to release the brake 347, FIG. 23, which keeps the pick-up jaws locked on the pins; (4) the sweep restart relay cam and switch SRA; (5) the cam and switch CSA controlling the solenoid CS, FIG. 21; (6) a cam PUA2 made of two segments which are relatively angularly adjustable, the two halves operating dual contacts arranged in parallel, the two segments of the cam being normally adjusted to open the power circuit to power unit motor PU for less than 10° of rotation of cam shaft 501; (7) and power unit timer circuit PUA3.

Indicator disks 509 are fixed by keys and set screws in their hubs on each shaft 365, 501, and bear inscribed marks having numbers corresponding to each of the nine cams, these marks to be placed successively in register with an index mark on the adjacent surface of the selector housing 513 in setting the several cams at their respective desired times of closing and opening their respective switches.

POWER UNIT CONTROL CIRCUITS

As noted under "Power Unit" the pick-up cam LC4 is engaged while solenoid CS is energized. The solenoid is controlled by the cam shift solenoid latching relay, CSR, FIG. 32, through the cam shift solenoid contactor, CSC, actuated by cam CSA. The cam shift solenoid latching relay, CSR, has two coils, designated SET and RESET in FIG. 32. Energizing the RESET coil latches its contacts 1/2, 3/4, 9/10, and 11/12 in the positions indicated on the diagram. They remain in these positions until the SET coil is energized, at which time the contacts are latched in the opposite directioin.

When the pin setter is returning to home position after setting ten new pins, rotating cam CSA in the power unit selector momentarily closes its contactor, completing the circuit through the cam shift solenoid contactor CSC, and the SET coil of relay CSR through NPR1–13/14, which is still energized. The cams are then shifted to the Ball 1 position by solenoid CS and the pick-up cam LC4 is in position to operate the pick-up mechanism. Energizing solenoid CS also actuates micro switches CSM and CTM through mechanical linkage. The normally open contacts of cam shift micro switch CSM are closed so that the deadwood cycle relay DWR will be energized through SGR2–13/14 contacts when the cycle is started. The normally open contacts of cam trip micro switch CTM are closed so that the cam trip contactor CTC and solenoid CT can be energized at the end of the cycle.

As the deadwood is being swept away, reset pins micro switch RPM in the sweep control is closed, and both the RESET coil of relay CSR and reset pins cam position relay RPR are energized through CSR-9/10 contacts. The cam shift solenoid contactor CSC is then de-energized by the opening of RPR-5/6 contacts. The pick-up cam LC4 is returned to its disengaged position by the return spring. Micro switch CSM is released so that the cam trip solenoid contactor CTC can be energized when needed. The standing pins are reset with no action by any of the cams.

When the pin setter is returning to home position after picking up and resetting the standing pins, rotating cam CSA in the power unit selector again closes its contactor. Relay NPR1 is not energized and NPR1-13/14 contacts are open, resulting in no effect on the SET coil of relay CSR. Since the normally open contacts of cam trip micro switch CTM and the normally closed contacts of cam shift micro switch CSM are closed, cam trip contactor CTC is energized to make solenoid CT release the latch that was holding the storage cams in their disengaged position. When the cam cluster shifts back to the left, the shift shaft releases the cam trip micro switch CTM and the normally closed contacts are connected to the ball indicator relay BIR through CSR-11/12 contacts, which light the Ball 2 lamp. Striker 201 on the end of the cam shift shaft 317, 321 moves into position to engage the bolt 198 on the crank arm 191 to release auxiliary arm 189 for the long stroke as soon as the power unit starts. The cams are now in position to perform the new-pin cycle.

During the Ball 1 or deadwood cycle, the deadwood cycle relay DWR, FIGS. 31 and 32, is kept energized to control the functions wanted. Similarly, the new pin relays NPR1 and NPR2 are kept energized throughout the Ball 2 or New Pin cycle.

The two sets of contacts of the cam shift micro switch CSM determine which relay combination, DWR or NPR, will be brought in when SGR2-13/14 contacts close at the beginning of a cycle.

If relay DWR is brought in, it holds itself in for the duration of the cycle through DWR-3/4 contacts, and positively prevents relays NPR1 and NPR2 from coming in through its normally closed contacts DWR-5/6. Likewise, if NPR1 and NPR2 are brought in at the beginning of the cycle, they hold themselves in over their NPR1-3/4 contacts, and prevent relay DWR from coming in by means of normally closed contacts NPR1-5/6.

Thus shifting of the cams can have no effect on these relays until the cycle is ended and SGR2-13/4 contacts open.

When a Ball 1 cycle is to be converted to a Ball 2 cycle because a strike or foul has occurred, the deadwood cycle relay DWR is de-energized as by cam STA acting to open relay contacts STR-5/6 or FBR-12/20. The new pin relays NPR1 and NPR2 are then energized through normally closed DWR-5/6 contacts, to supply a new set of pins.

*Pick-up of standing pins.*—The standing pins are picked up by the pin setter shortly after the sweep reaches GP1 on the Ball 1 cycle. Signal hold relay STR2 and the deadwood cycle relay DWR remain energized during this operation. The pick-up cam LC4 is in position to effect pick-up of the pins.

As the sweep moves from home to GP1, timer start micro switch TSM in the sweep control SC closes to energize the timer delay relay TMR and the timer pilot relay TPR. Relay contacts TPR-1/3 close to hold the relays in, since relay TMR is not self-holding. Relay TMR is set to provide 3.2 seconds delay from the time of ball impact to the time the pin setter touches the heads of the standing pins.

Power unit relay PUR1 is energized to start the power unit cycle by the closing of time delay relay contacts TMR-2/6. PUR1 holds itself over PUR1-1/3 contacts. The sequence in detail involves four relays. Power unit relay PUR4 is energized through PUR1-7/8 contacts. The power unit contactor is brought in through PUR4-4/5 to start the motor PU. PUR3 is used to drop and lock out starting relay PUR1 by opening normally closed PUR3-5/6 contacts right after the motor PU starts. Relay PUR3 is energized through PUR4-7/8 and PUR2-1/3 contacts. The power unit lowers the pin setter and the pick-up cam operates to pick up the standing pins.

Switch PUA2 in the selector opens to stop the pin setter in its home position at the end of a power unit cycle. Although it is open for less than 10° of the power unit cycle, it may be open when the cycle is restarted. This is dependent on the effectiveness of braking action in the power unit motor. If PUA2 is open, the PUR4 hold, the PUR3 pull-in, and the PUR1 lockout circuits will be completed at the same time; this might cause PUR4 to drop out and stop the power unit motor PU. Power unit relay PUR2 is used to prevent this PUR4 drop-out. PUR2 will come in as soon as switch PUA2 closes.

*Resetting standing pins.*—After picking up the standing pins the power unit remains at rest while the sweep moves from GP1 to GP2. As the sweep approaches GP2 after sweeping the fallen pins into the pit, the power unit restart micro switch PUM in the sweep control closes to energize power unit relay PUR1. The power unit is started with the same relay sequence as for picking up standing pins.

When the pin setter has re-set the standing pins on the pin deck, the rotating cam PRA in the power unit selector closes its switch. This energizes the pin setter lock release contactor PRC through CSR-1/2. The pin setter lock release solenoid PR is energized to unlock the pick-up jaws and release the pins. As the pin setter approaches its home position, rotating cam SRA in the power unit selector closes its switch to start the sweep drive and rotating cam PUA2 opens its switch to stop the power unit as before.

*Setting new pins.*—After the sweep has cleared the alley on a Ball 2 cycle and is approaching GP2, power unit restart micro switch PUM in the sweep control is closed. On this cycle, relay contacts DWR-13/14 are open, but if there are ten pins in storage, relay PUR5 is de-energized, and relay PUR1 is energized through PUR5-5/6 contacts and the power unit starts. (Additional functions of relay PUR5 are covered hereinafter.) Shortly after the power unit starts, the storage cam operates, dumping ten new pins into the pin setter as it starts its descent.

While the pin setter is descending with the pins, switch PUA1 in the power unit selector closes to energize relay PUR5 once again. This relay remains locked in by its own contacts 1/3 until the storage is filled once more.

As on previous cycles, rotating cam SRA and its switch start the sweep drive and rotating cam PUA2 stops the power unit.

*Converting to strike cycle.*—As described, when the pin setter descends lower than the normal distance on the Ball 1 cycle because there are no standing pins, the oscillating strike cam STA closes its contact and energizes the strike relay STR and the strike indicator relay SIR. This action de-energizes the deadwood relay DWR by opening STR-5/6 contacts, and energizes the cam trip contactor CTC by closing STR-9/11 and STR-10/12 contacts.

The pin setter continues its cycle with the pick-up bars closed. When the PRA contact in the selector closes, the pin setter lock release contactor PRC will become energized through relay STR-3/4 contacts. This energizes the pin setter lock release solenoid PR, which will hold the lock in the released position. The pick-up bars will open when the cam follower rides off the power unit pick-up cam LC4. The sweep is restarted by rotating contact maker SRA. As the sweep operates, reset pins micro switch RPM in the sweep control SC is closed. The sweep stops at GP2. The reset coil of relay CSR and the reset pins cam position relay RPR are energized by the closing of RPM. As a result, cam shift contactor CSC and solenoid CS will drop out. Cam trip contactor CTC is energized through STR–9/11 and STR–10/12. Cam trip solenoid CT is energized. All cams LC1–4 will shift to new pins position. In this position new pins cam relays NPR1 and NPR2 and the ball indicator relay BIR are energized through the normally closed side of the CSM and CTM micro switches and through DWR–5/6. However, the strike light "X" will still show, because SIR and STR relays remain energized until the end of the cycle. When SIR is energized, SIR–1/2 contacts are open, therefore neither the Ball 1 nor Ball 2 lights can come on. The machine proceeds through a normal new pins cycle and sets ten new pins. At the end of the cycle, when the sweep reaches home position, signal hold relay SGR2 will drop out. This will cause normally closed contacts SGR2–16/17 to break the circuit to STR and SIR, de-energizing them. The Ball 1 light will now come on as BIR relay is relaxed. The machine is now ready for another normal Ball 1 cycle.

*Foul ball cycle.*—If, when set for Ball 1, the machine receives a cycle signal while the foul indicator relay, FIR, is energized, the foul ball relay FBR will be energized through cam shift micro CSM, relay contacts FIR–4/5, SGR1–16/17, and SGR2–13/14. FBR holds itself over contacts FBR–3/4 and FBR–13/14 until the end of the cycle. Similar to the strike cycle conversion, the deadwood relay is de-energized (contact FBR–12/20) and cam trip contactor CTC is energized (contacts FBR–9/11 and FBR–16/17). The RESET coil of relay CSR and reset pins cam position relay RPR are energized through relay contact FBR–6/7. The cams immediately shift to new pins position and Ball 2 is indicated. The machine then proceeds to set ten new pins in a normal new pin cycle, but will again remain in a new pin position at the end of the cycle, ready for Ball 2. The foul ball signal relay FIR will remain energized only as long as the foul indicator light is lit, which is for 10 to 15 seconds. If a cycle is not initiated within that time, the machine will go through a normal Ball 1 cycle. This protects against an undesired response by the machine in the event that someone inadvertently actuates the automatic foul detector between frames.

If FIR is energized prior to a Ball 2 cycle, FRB cannot be energized because the cams are in new pins position and the cam micro switches CSM and CTM do not provide circuit continuity to relay FBR. Therefore the machine will proceed through a normal Ball 2 cycle.

*Out-of-range operation.*—As indicated above, the reduced travel of the pin setter when a pin is out of range closes contacts ORA1 and ORA2 in the selector simultaneously to energize out-of-range relays ORR1 and ORR2, as well as the out-of-range indicator relay OIR. These relays are held through ORR1–1/3 and SGR2–13/4 contacts. Relay contacts ORR1–7/8 are closed to energize the sweep drive contactor SDC2, which sets up the sweep motor circuit to run in reverse when the sweep is restarted.

Relay contacts ORR2–7/8 are closed to energize the RESET coil of relay CSR and reset pins cam position relay RPR. This action de-energizes the cam shift solenoid contactor CSC, the pick-up cam LC4 shifts home immediately, and the pick-up cam will not engage its follower to close the pick-up bars as the pin setter continues to home position.

As the pin setter approaches its home position, the sweep is not restarted by relay SDR1 because relay contacts ORR1–5/6 are open. The rest of the cams are shifted to new pins position when rotating contact CSA energizes cam trip solenoid contactor CTC.

After the deadwood is cleared by hand, sweep drive relay SDR4 is energized by pressing one of the sweep reverse buttons ORB1 or ORB2. Since sweep drive contactor SDC2 is energized, the sweep motor runs in reverse until micro switch SLM opens, de-energizing signal hold relay SGR2 and bringing the machine to rest in a Ball 2 condition.

STORAGE CONTROL CIRCUITS

Storage control circuits are arranged as in our copending application Serial No. 625,739 to delay two operations until the proper time. These are:

(1) Delay the setting of new pins by the pin setter until there are ten pins in storage.

(2) Stop the pin lift when there are ten pins in storage and nine pins in the index to avoid adding ten more pins to storage jamming the index.

*Delay in setting pins.*—The power unit delay relay PUR5 is used for storage control functions. When the storage is empty, relay PUR5 is always energized and the storage light is lit to so indicate. The storage light is a small red light on top of the machine.

Assume that the machine is called on to set ten new pins. Micro switch PUM in the sweep control closes as the sweep is approaching GP2. Closing PUM would normally energize relay PUR1 to start the power unit cycle through either PUR5–5/6 or DWR–13/14. In this cycle DWR is relaxed, therefore DWR–13/14 contacts are open. If the storage is empty, PUR5 will be energized and PUR5–5/6 will also be open. Therefore the power unit start relay PUR1 cannot be energized and the power unit will not start.

The pin lift continues to deliver pins to the index until the index is full. As the index dumps the pins into storage, dump limit micro switch DLM is actuated. With PUR5 energized, normally open contacts PUR5–4/5 and 7/8 are closed. Auxiliary starter relay PUR6 is energized by micro switch PUM when the storage is empty, through PUR5–4/5. Relay PUR6 holds itself in over contacts PUR6–1/3, NPR2–4/5 and the pin lift stop micro switch PLM. The normally open contacts close to energize relay PUR1 through relay contacts PUR6–7/8, and start the power unit. The normally closed contacts open and de-energize relay PUR5. The storage light goes out, indicating that the storage has a set of pins.

As the pin setter is setting the ten new pins on the deck, the power unit delay contact PUA1 in the power unit selector closes. Relay PUR5 is again energized and the storage light is turned on.

*Stopping of pin lift.*—As long as the pin lift delivers pins to the index, they are accepted. When there are ten pins in the index, they are dumped into storage automatically before the next pin is received from the pin lift.

If the pin setter is not using the pins in storage, the pin lift must be stopped before a second set of pins is dumped into storage, jamming the index. The pin lift stop micro switch PLM on the index assembly performs this function.

When the ninth pin is received in the index, a cam on the rim or the index will open micro switch PLM. If there are already ten pins in storage, relay PUR5 is de-energized and relay contacts PUR5–7/8 are open. Pin lift clutch contactor PLC will then be de-energized, disengaging the pin lift clutch and stopping the pin lift.

As soon as the pin setter sets ten pins on deck, relay PUR5 is again energized, relay contacts PUR5–7/8 close, and the pin lift resumes delivering pins to the index.

DUAL BALL RETURN

As the balls leave the elevators of the paired machines installed side by side as customary, they are directed to a common track, not shown, for return to the bowlers. A solenoid-operated mechanism of known type is used to hold the ball returning from the right-hand machine should a ball from the left-hand machine be approaching the junction to the common track.

The solenoid DB is actuated by micro switch DBM1 on the ball elevator of the left-hand machine by the ball as it leaves the elevator. When the solenoid is energized, any ball from the right-hand machine is held mechanically on the track before the junction. Micro switch DBM2 is mechanically connected to the solenoid mechanism and holds the solenoid in the energized position. After the ball from the left-hand machine has entered the common track, it actuates micro switch DBM3, which de-energizes the solenoid and releases any ball held by the solenoid mechanism.

MACHINE CYCLE PUSH BUTTONS

There are three machine cycle push buttons for putting the machine through a cycle without rolling a ball. One of these, MCB3, is at the bowler's position for use on a tenth-frame spare. The other two are on the machine: one, MCB2, on the attendant's control panel at the rear of the machine and one, MCB1, half-way down the left-hand side of the machine.

The three buttons are connected in parallel to close the circuit to machine cycle relay MCR whenever the machine is not already in cycle. Relay MCR holds itself in over contacts MCR-1/3 until micro switch SGM opens. Signal hold relay SGR2 is energized throughout the cycle and relay contacts SGR2-5/6 lock out the machine-cycle buttons during this time. Therefore, no harm can be done by the bowler pressing the button while the machine is in midcycle, or by holding the button in during the cycle.

Track relay TKR is energized by SGR1-9/11 as the cycle commences, but cannot hold itself in because MCR-5/6 contacts remain open until after SGR1-9/11 contacts open. Relay TKR will thus drop out again. If relay TKR were allowed to remain in, the circuit from micro switches BUM1, BUM2, and BUM3 would be locked out, and the machine would not cycle when the next ball was rolled.

While we have illustrated and described certain forms in which the invention may be embodied, we are aware that many modifications may be made therein by any person skilled in the art, without departing from the scope of the invention as expressed in the claims. Therefore, we do not wish to be limited to the particular forms shown, or to the details of construction thereof, but what we do claim is:

1. In a machine for setting bowling pins on the pin spots of a bowling alley, a vertically reciprocable pinsetting and resetting means, said pinsetting means having in combination vertically spaced parallel platforms, each said platform having ports registering with the pin spots on said alley and with the corresponding ports on the other said platform; means associated with the lower said platform for retrieving standing pins from said alley and releasably retaining said pins within the ports in said lower platform; means associated with the upper said platform for optionally closing the ports in said platform and for retaining pins thereon when closed; means including a pair of yokes associated with each said port, said yokes pivotally mounted on said upper said platform, said last recited means adapted to arrest said pins and to suspend each said pin by the neck thereof when said pins are released through the ports on said upper platform in such position that the base of each said pin extends through the associated port in said lower platform; means for feeding pins to the ports in said upper platform; and means for raising and lowering said pinsetting and resetting means.

2. A bowling pinsetting machine as claimed in claim 1 wherein said means associated with the lower said platform for retrieving standing pins comprises a pair of pin retrieving jaws mounted on said platform adjacent each port with capacity for movement across said port, spring means yieldably urging said jaws apart, actuating means attached to each said jaw and drive means associated with said actuating means to draw the jaws in each said pair of jaws toward each other.

3. A bowling pinsetting machine as claimed in claim 2 wherein said actuating means comprises cable means passing around a portion of each jaw and said drive means comprises means for applying a pull to said cable means.

4. A bowling pinsetting machine as claimed in claim 2 wherein said jaws are each provided with a sprocket rotatably mounted thereon, said actuating means comprising a chain passing around both sprockets associated with a pair of jaws and said drive means comprises means for applying a pull to said chains.

5. A bowling pinsetting machine as claimed in claim 4 wherein means are provided to permit the continued travel of each said chain in response to said drive means even after the travel of the associated said jaw has been arrested.

6. A bowling pinsetting machine as claimed in claim 4 wherein said lower platform is provided with a parallel shaft member adjacent each port, wherein each said jaw is provided with a hub adapted to engage said shaft for sliding movement thereon, wherein said sprockets are rotatably mounted on said hubs, and wherein each said chain extends in reverse direction about the associated said sprocket.

7. A bowling pinsetting machine as claimed in claim 6 wherein spring means including a spring are provided for each said jaw attached to said platform and wherein one end of each such chain is attached to said drive means and the other end of each such chain is attached to the associated said last recited spring means, whereby any additional pull on any said chain after the associated said jaw is arrested in its lateral movement extends the associated said spring.

8. A bowling pinsetting machine as claimed in claim 2 wherein means are provided associated with said upper said platform to retain the head of said pins in fixed position while said pin retrieving jaws are operative to retrieve the pins.

9. A bowling pinsetting machine as claimed in claim 8 wherein said means associated with said upper platform to retain the head of said pins comprises in each instance a resilient pad affixed to the underside of the means in said upper platform for optionally closing the ports therein.

10. A bowling pinsetting machine as claimed in claim 2, wherein said drive means includes a cam means to apply tension on said actuating means, and means to prevent the recoil of said actuating means and the resulting release of said jaws after said cam means becomes in operative.

11. A bowling pinsetting machine as claimed in claim 10 wherein the means to prevent the recoil of the actuating means is wholly independent of the cam means.

12. A bowling pinsetting machine as claimed in claim 1 wherein each said pair of yokes in said arresting means is pivotally mounted on said upper platform to swing about an axis diametrically disposed to each port and to move to and from a position over the central area of such port, wherein connecting means are provided connecting the members of each pair to move in unison toward and from each other and wherein actuating means are provided actuating all the pairs in unison into their position over such central areas to grasp the neck of said pins and to release said pins upon command.

13. A bowling pinsetting machine as claimed in claim 12, wherein said arresting means for grasping the necks of said pins are so arranged that said pins are suspended with a capacity for axial movement while so grasped.

14. A bowling pinsetting machine as claimed in claim 12 wherein means associated with said raising and lowering means are provided to release said pins from said arresting means when said pinsetting and resetting means have been lowered to a position adjacent said alley.

15. A bowling pinsetting machine as claimed in claim 1 wherein said means optionally closing said ports on said upper platform comprise retractable means adapted to underlie and support said pins upon release of said pins from said pin feeding means.

16. A bowling pinsetting machine as claimed in claim 15 wherein said retractable means are provided with plain surfaces and are adapted to underlie said upper platform and to slide relative thereto in a direction parallel thereto.

17. A bowling pinsetting machine as claimed in claim 1 wherein said means for feeding said pins comprises means for collecting said pins into a circular array and a fixed platform for receiving said collected pins and storing said pins releasably each directly above a port in said upper platform.

18. A bowling pinsetting machine as claimed in claim 17 wherein said fixed platform for receiving and storing said pins is provided with a plurality of pin receiving means aligned with said ports on said pinsetting and resetting means, each such pin receiving means comprising a port, a pin guide means adjacent the last recited port, retractable stop means arranged in the last recited port to prevent the passage of pins therethrough and means connecting said retractable stop means together to move said stop means into and out of the paths of pins received in said pin receiving means, each said stop means comprising a pair of truncated conical resilient elements disposed with their apex ends toward each other, a spindle on which said elements are rotatably mounted and a shank affixed to said spindle and slidably mounted on said platform.

19. A bowling pinsetting machine as claimed in claim 1 wherein said means for raising and lowering said pinsetting and resetting means includes a shaft positively rotated by the pinsetting means as it descends and means locking said shaft against rotation in a direction to lower the pinsetting means when the raising and lowering means is relieved of a substantial part of the weight of the pinsetting and resetting means.

20. A bowling pinsetting machine as claimed in claim 19 wherein the positive rotation of said shaft is accomplished by providing said pinsetting means with a vertically oriented rack and said shaft with a pinion, said pinion engaging said rack.

21. A bowling pinsetting machine as claimed in claim 1 wherein said means for raising and lowering said pinsetting and resetting means comprises a cable attached to said pinsetting means, power means to actuate said cable and means actuated by the subnormal tension on said cable to disconnect said power means.

22. A bowling pinsetting machine as claimed in claim 21 wherein said cable is mounted at one end in a yieldable anchorage and wherein means are provided for arresting the lowering of the pinsetting means if the normal descent thereof is checked.

23. A bowling pinsetting machine as claimed in claim 22 wherein said means arresting the lowering of said pinsetting means includes means disconnecting said power means.

24. A bowling pinsetting machine as claimed in claim 1 wherein said means for raising and lowering said pinsetting and resetting means are adapted to position said setting means optionally in a pin receiving home position away from said alley, a pin-setting position adjacent said alley and an intermediate pin resetting position, and where control means are provided (1) to return said pinsetting means to said home position if the descent of said means to said pin resetting position is prevented, (2) to initiate a standing pin resetting cycle if the descent of said pinsetting means is stopped when said pinsetting means is at said resetting position and (3) to omit said pin resetting cycle if in its downward descent, said pinsetting means travels past said pin resetting position without hindrance.

References Cited by the Examiner

UNITED STATES PATENTS

| 1,584,030 | 5/26 | Gray | 273—42 |
| 2,221,697 | 11/40 | Ball | 273—42 |
| 2,300,802 | 11/42 | Parra et al. | 273—42 |
| 2,514,457 | 7/50 | Schmidt | 273—43 |
| 2,530,385 | 11/50 | Frye | 273—43 |
| 2,595,988 | 5/52 | Simpson | 273—43 |
| 2,634,978 | 4/53 | Anderson | 273—42 |
| 2,645,485 | 7/53 | Mead | 273—42 |
| 2,705,146 | 3/55 | Montooth et al. | 273—43 |
| 2,723,123 | 11/55 | Hedenskoog et al. | 273—43 |
| 2,755,089 | 7/56 | Zuercher | 273—42 |
| 2,853,300 | 9/58 | Montooth et al. | 273—43 |
| 2,879,997 | 3/59 | Black et al. | 273—43 |
| 2,911,218 | 11/59 | Scherzinger | 273—43 |
| 2,973,204 | 2/61 | Huck et al. | 273—43 |
| 2,977,121 | 3/61 | Flint et al. | 273—43 |
| 3,014,720 | 12/61 | Barrows | 273—42 |
| 3,063,716 | 11/62 | Dowd et al. | 273—43 |
| 3,068,005 | 12/62 | Dumas | 273—43 |
| 3,081,086 | 3/63 | Butterfield | 273—43 |
| 3,082,001 | 3/63 | Blewitt | 273—43 |

DELBERT B. LOWE, *Primary Examiner.*

ANTON O. OECHSLE, *Examiner.*